June 6, 1967  R. W. BUSHMEYER ET AL  3,323,445
AGRICULTURAL IMPLEMENT
Original Filed June 10, 1963  14 Sheets-Sheet 2
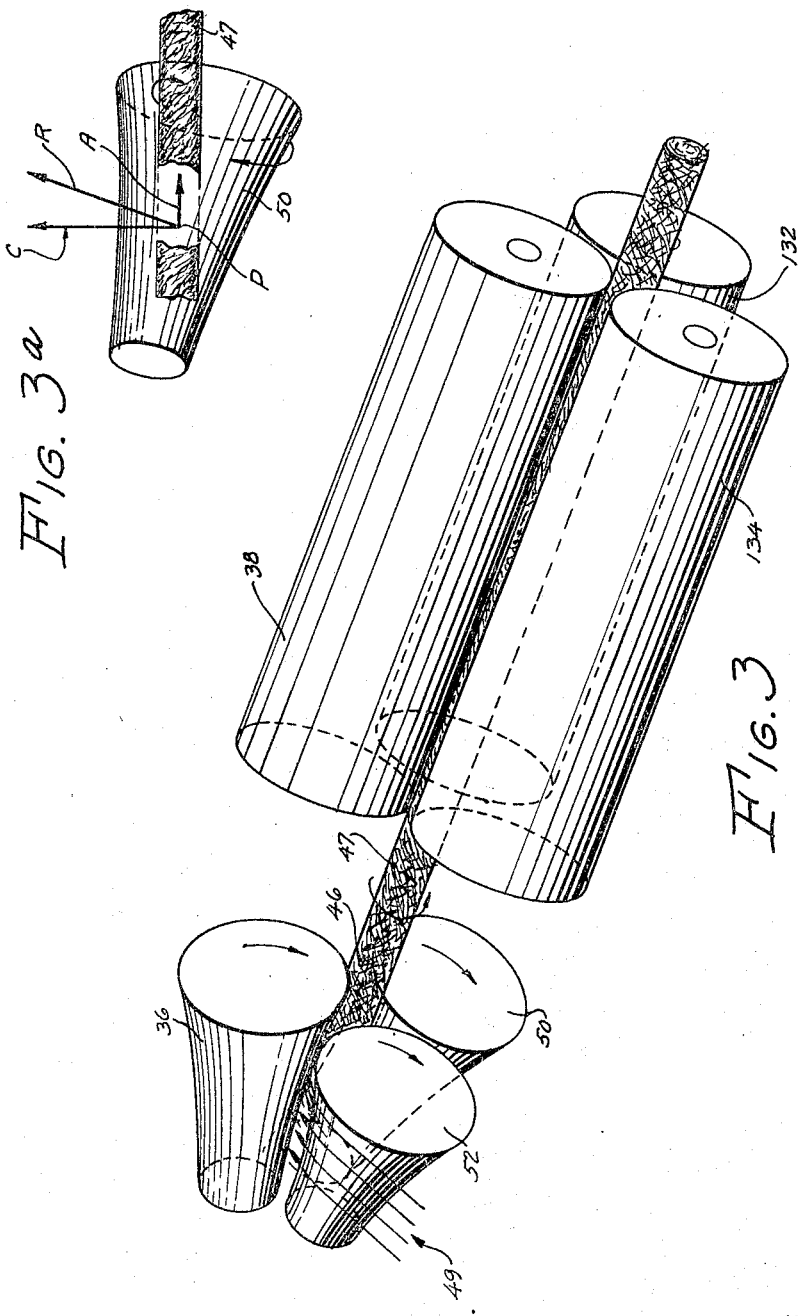
INVENTORS
RICHARD W. BUSHMEYER
CHARLES D. MILLER, DECEASED
By JOHN T. HOLMSTROM, Jr.
SPECIAL ADMINISTRATOR
By EMERSON B. DONNELL and
JACK SHORE
ATTORNEYS

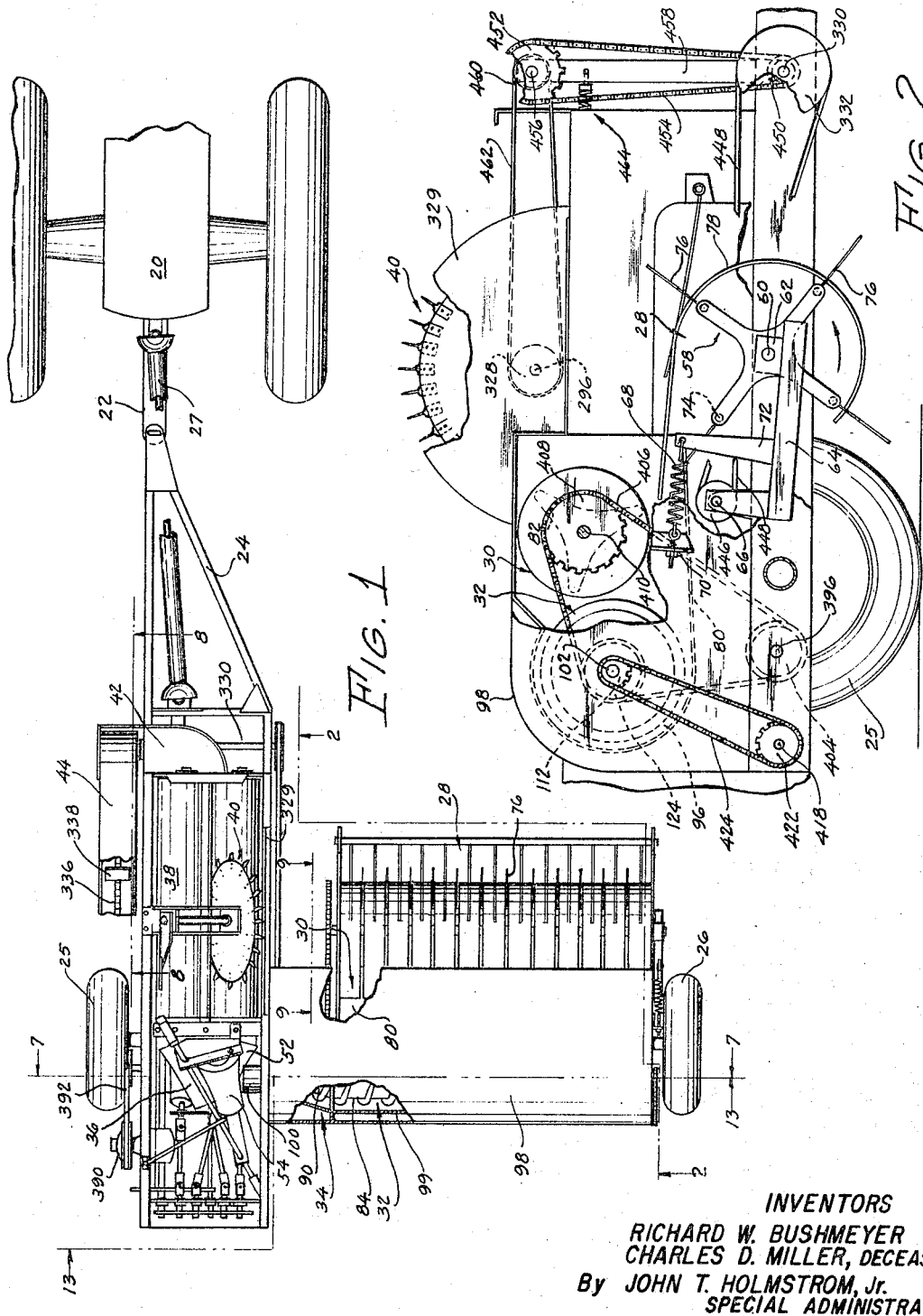

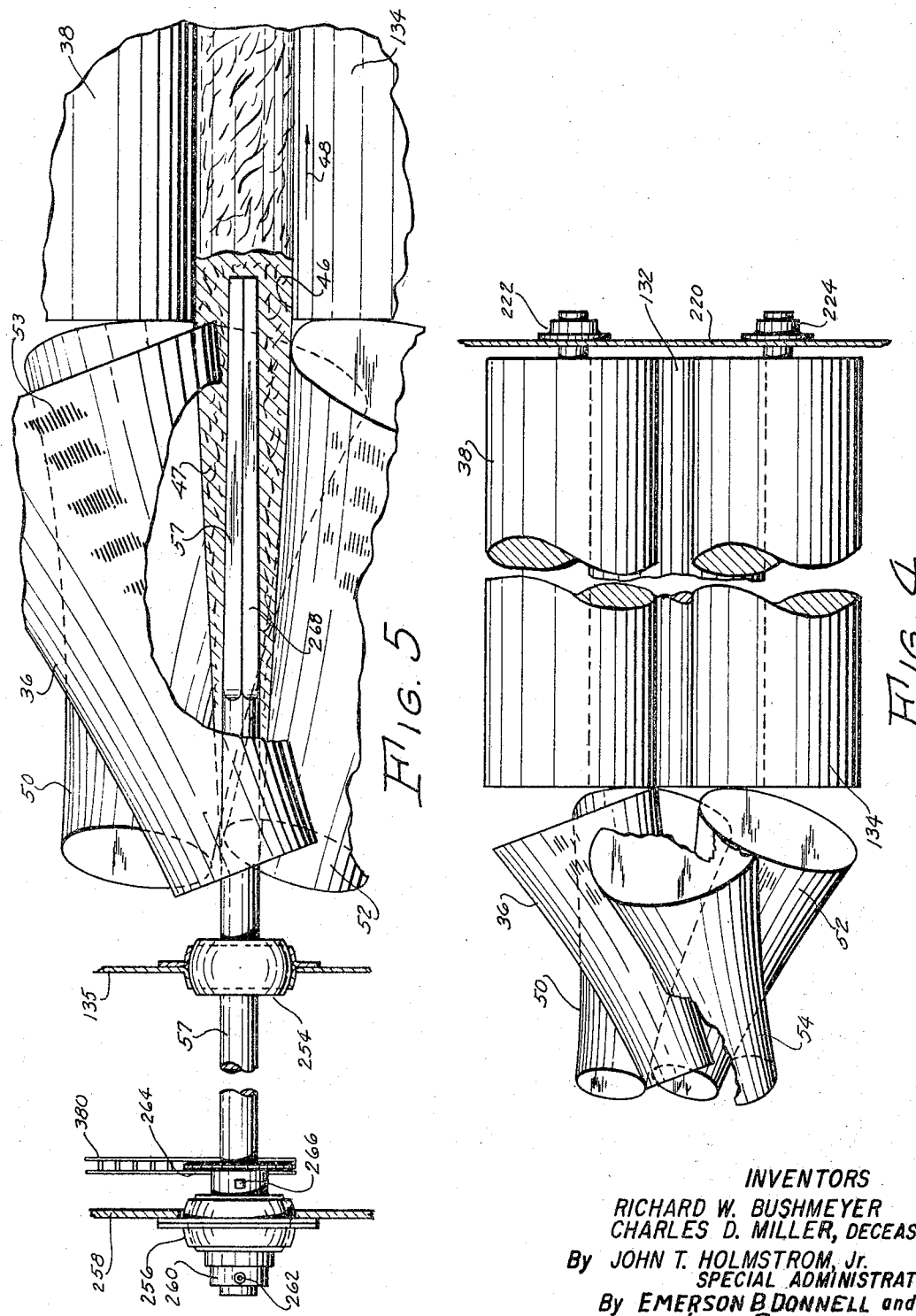

June 6, 1967     R. W. BUSHMEYER ETAL     3,323,445
AGRICULTURAL IMPLEMENT
Original Filed June 10, 1963     14 Sheets-Sheet 4
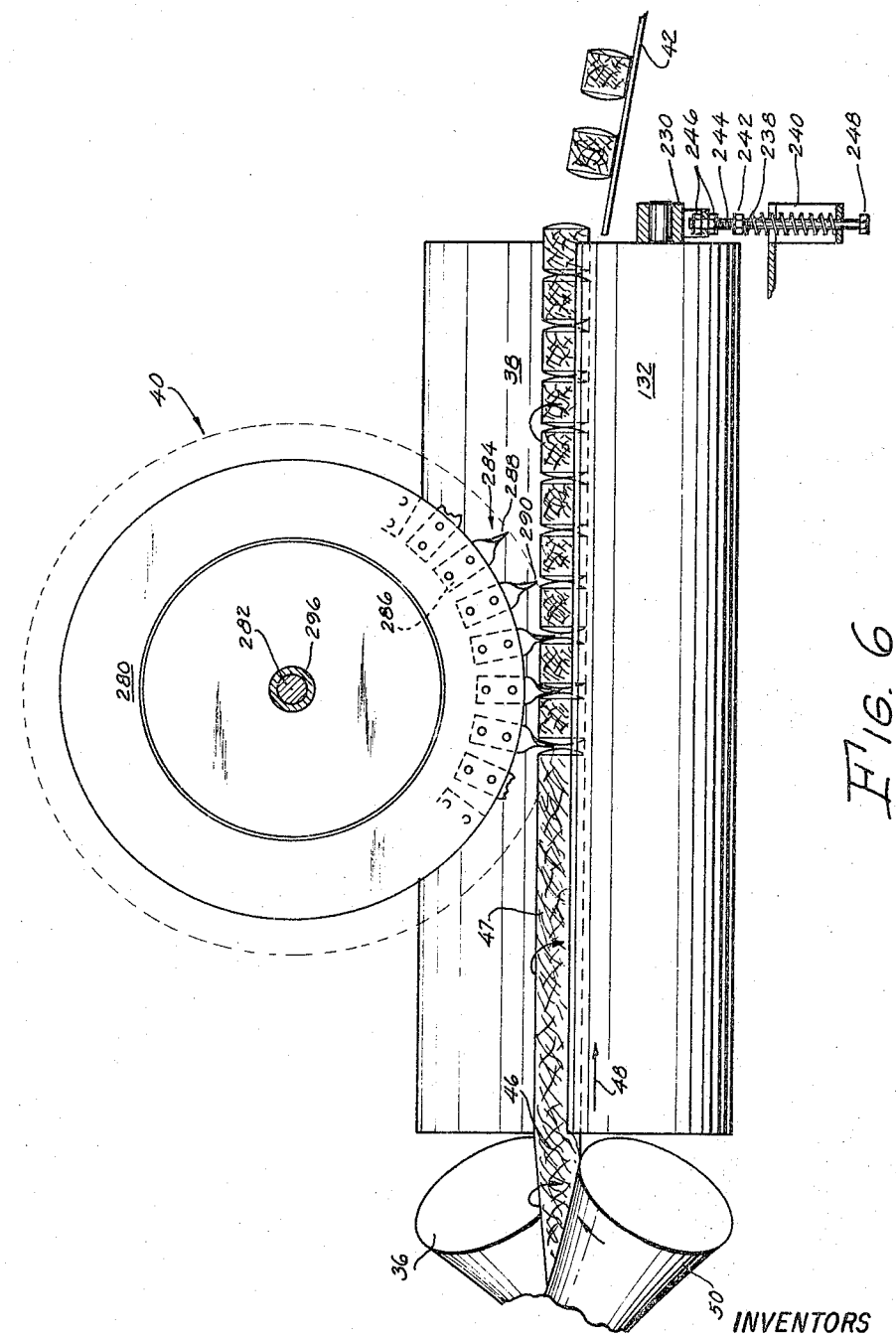
INVENTORS
RICHARD W. BUSHMEYER
CHARLES D. MILLER, DECEASED
By JOHN T. HOLMSTROM, Jr.
    SPECIAL ADMINISTRATOR
By EMERSON B DONNELL and
JACK SHORE
    ATTORNEYS June 6, 1967
R. W. BUSHMEYER ETAL
3,323,445
AGRICULTURAL IMPLEMENT
Original Filed June 10, 1963
14 Sheets-Sheet 5
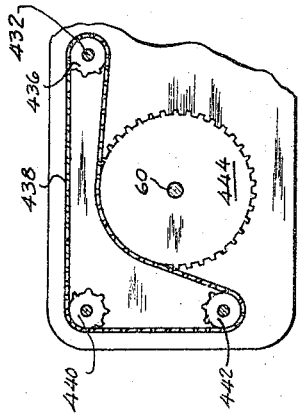
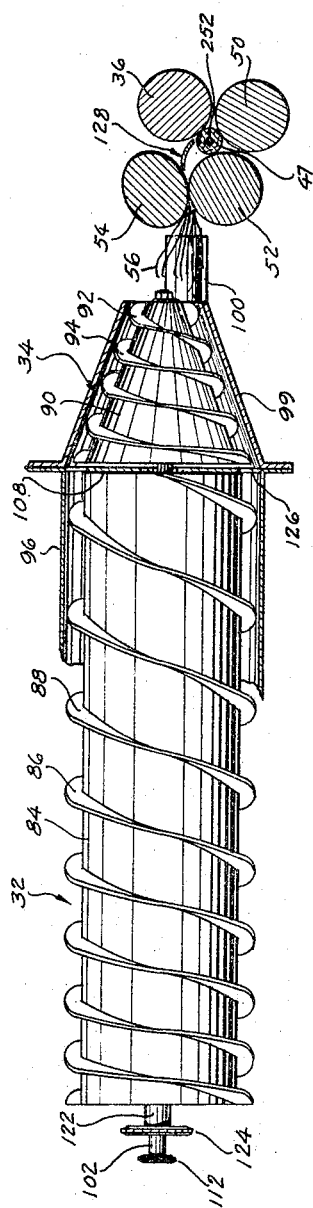
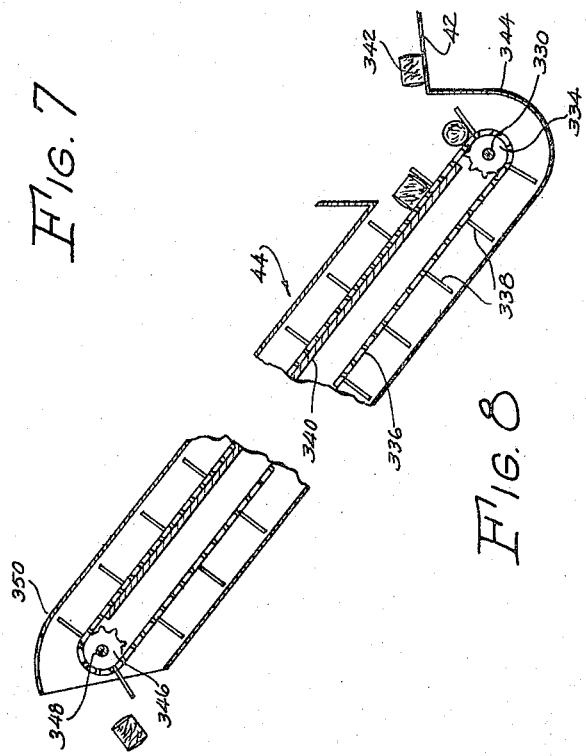
INVENTORS
RICHARD W. BUSHMEYER
CHARLES D. MILLER, DECEASED
By JOHN T. HOLMSTROM, Jr.
SPECIAL ADMINISTRATOR
By EMERSON B. DONNELL and
JACK SHORE
ATTORNEYS

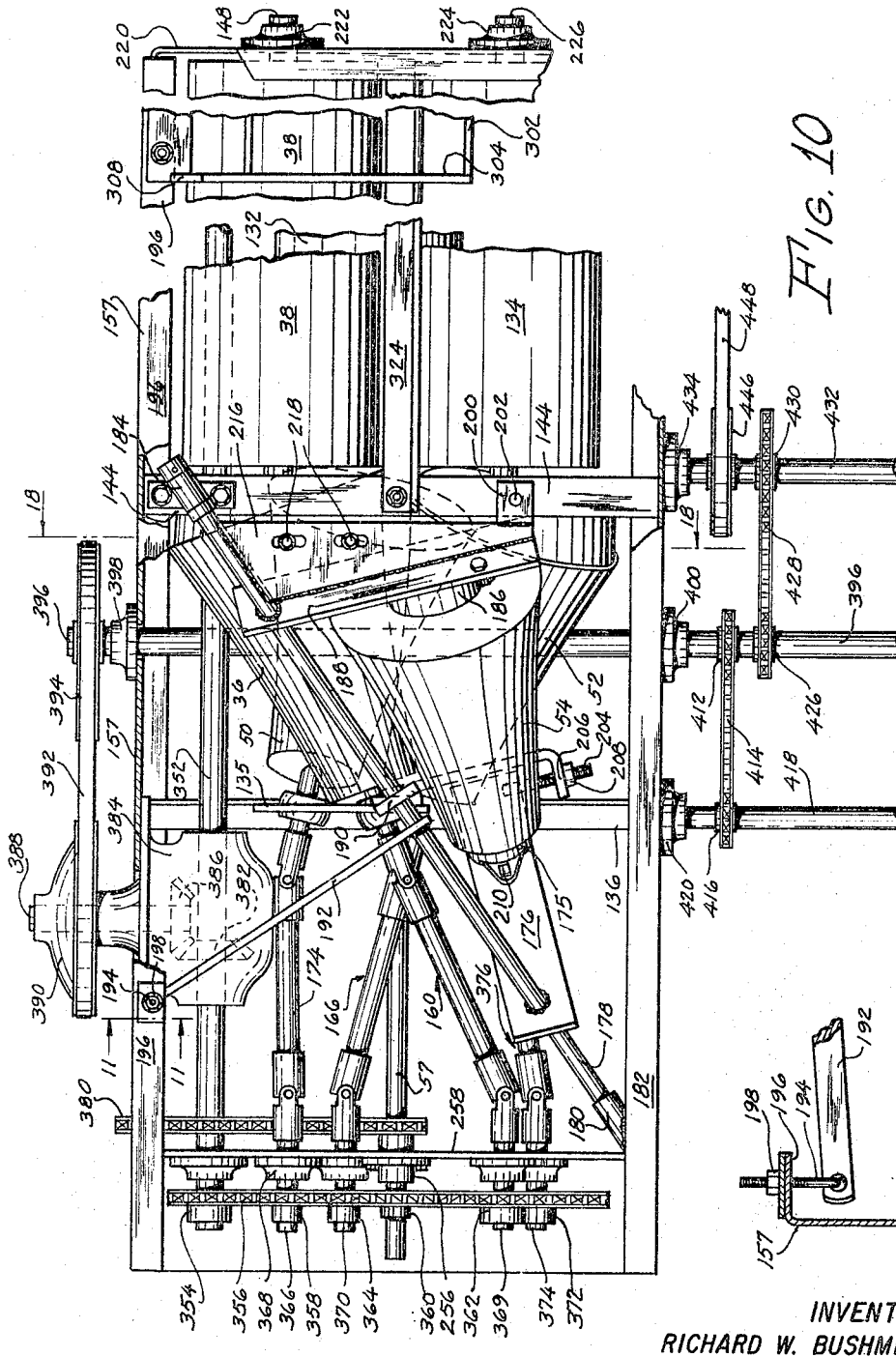

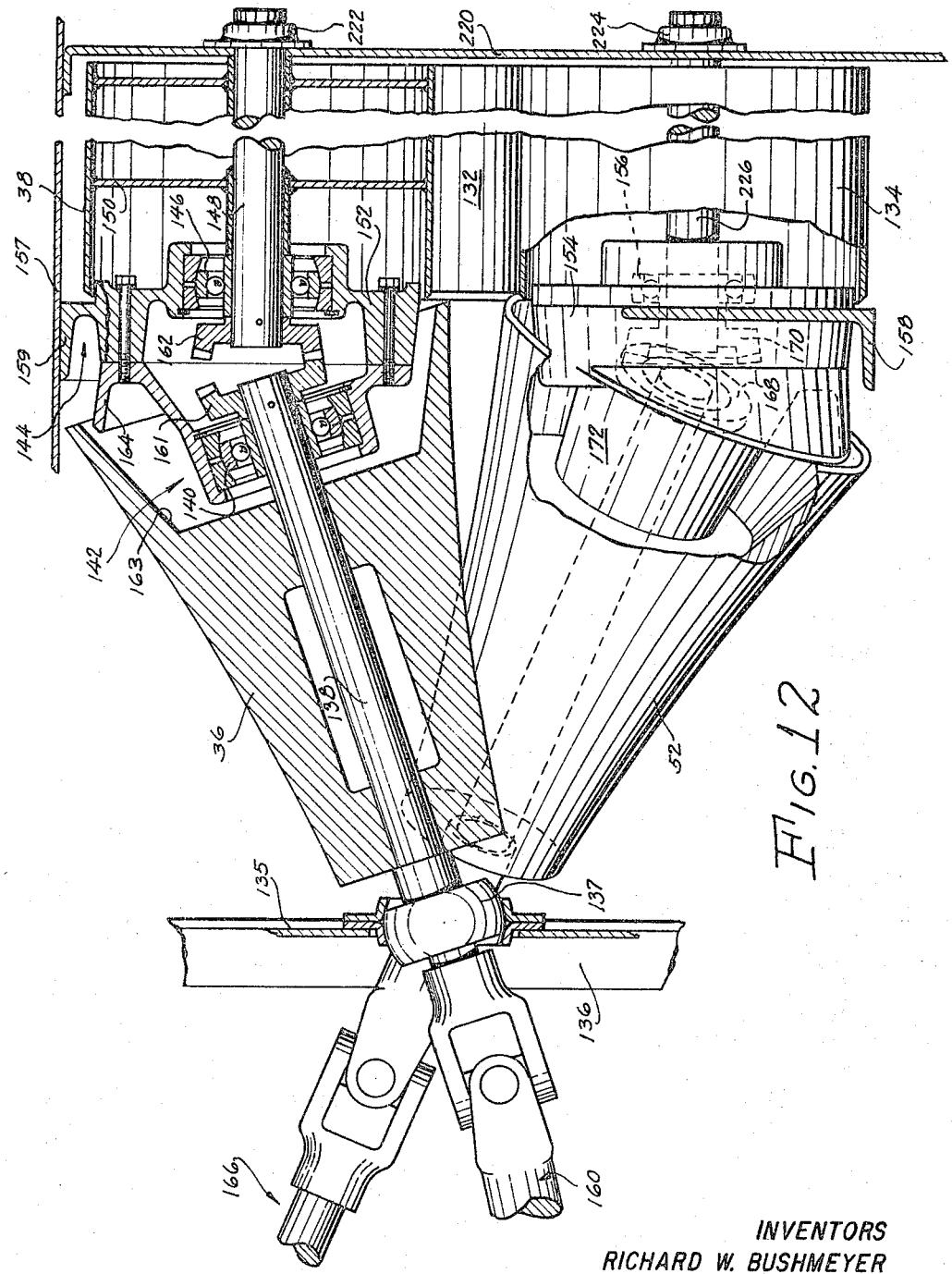

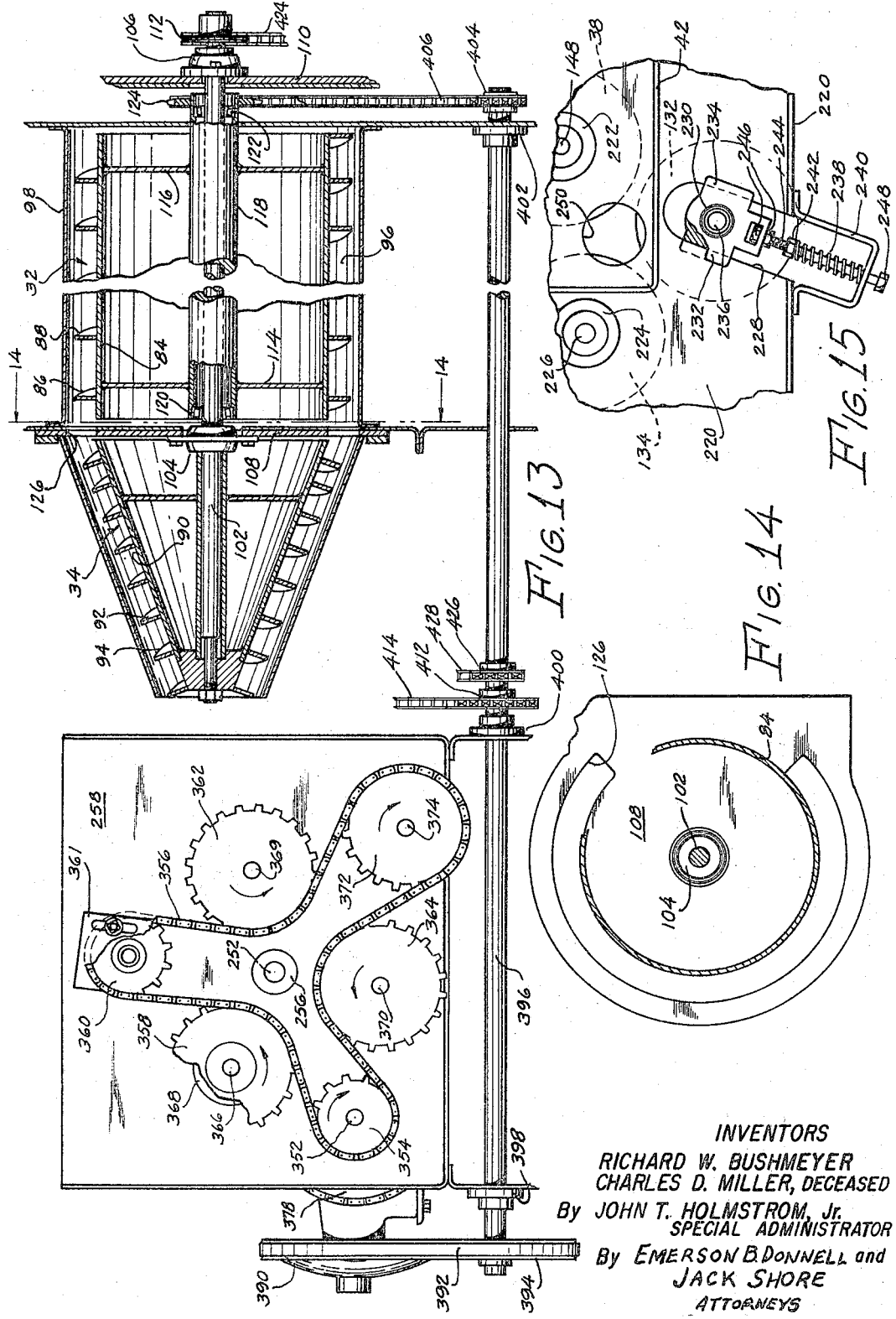

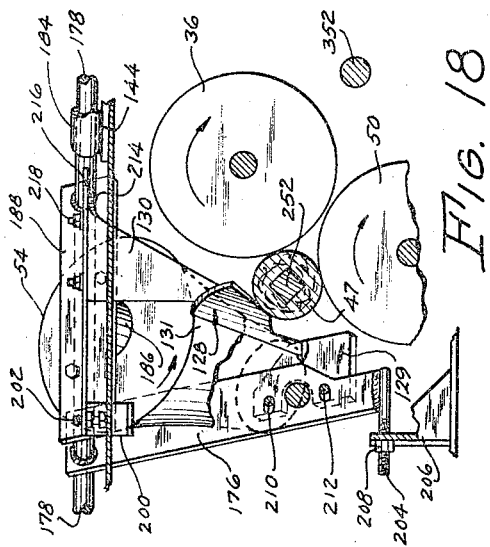
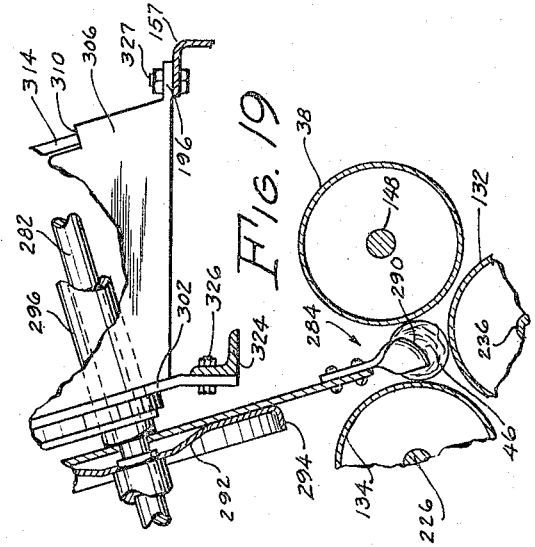
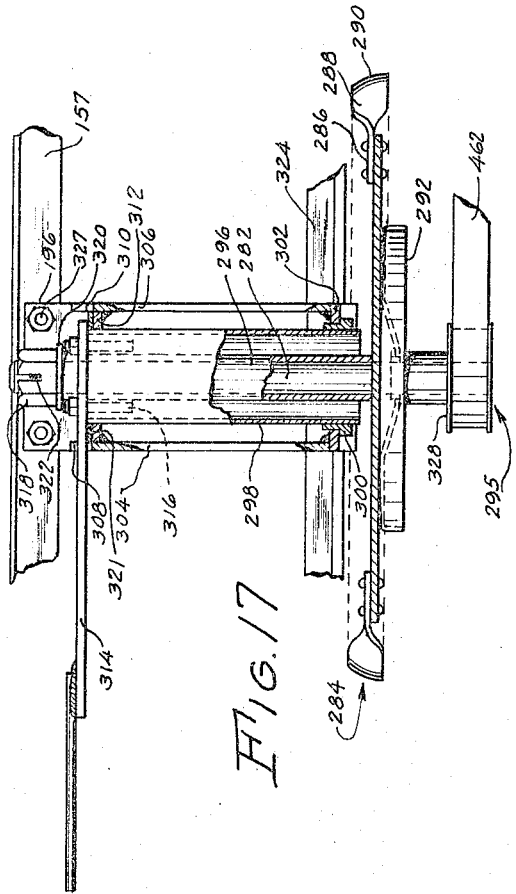
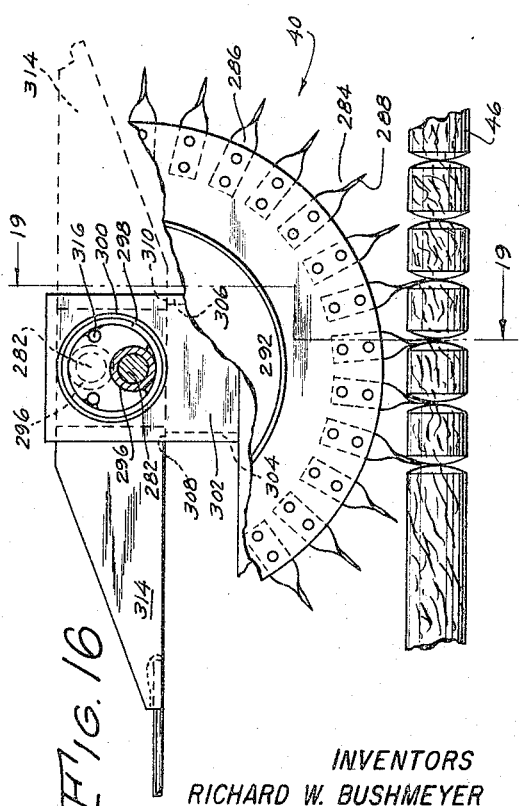

INVENTORS
RICHARD W. BUSHMEYER
CHARLES D. MILLER, DECEASED
By JOHN T. HOLMSTROM, Jr.
SPECIAL ADMINISTRATOR
By EMERSON B DONNELL and
JACK SHORE
ATTORNEYS

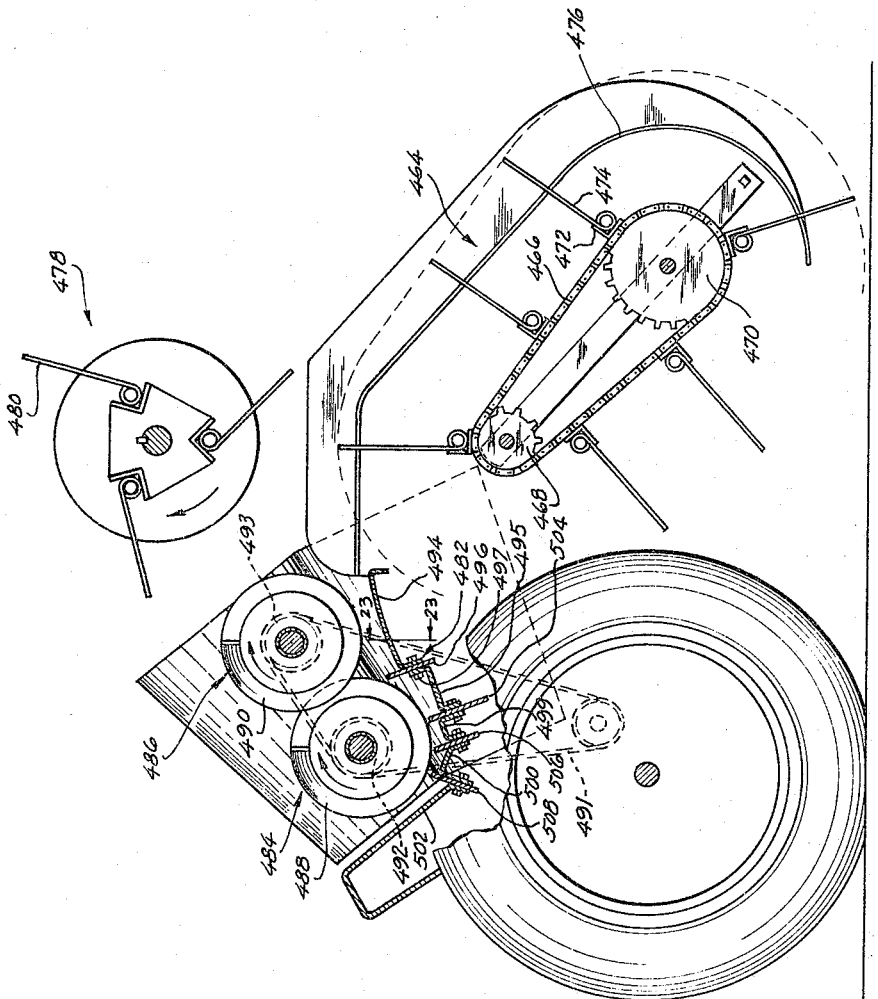

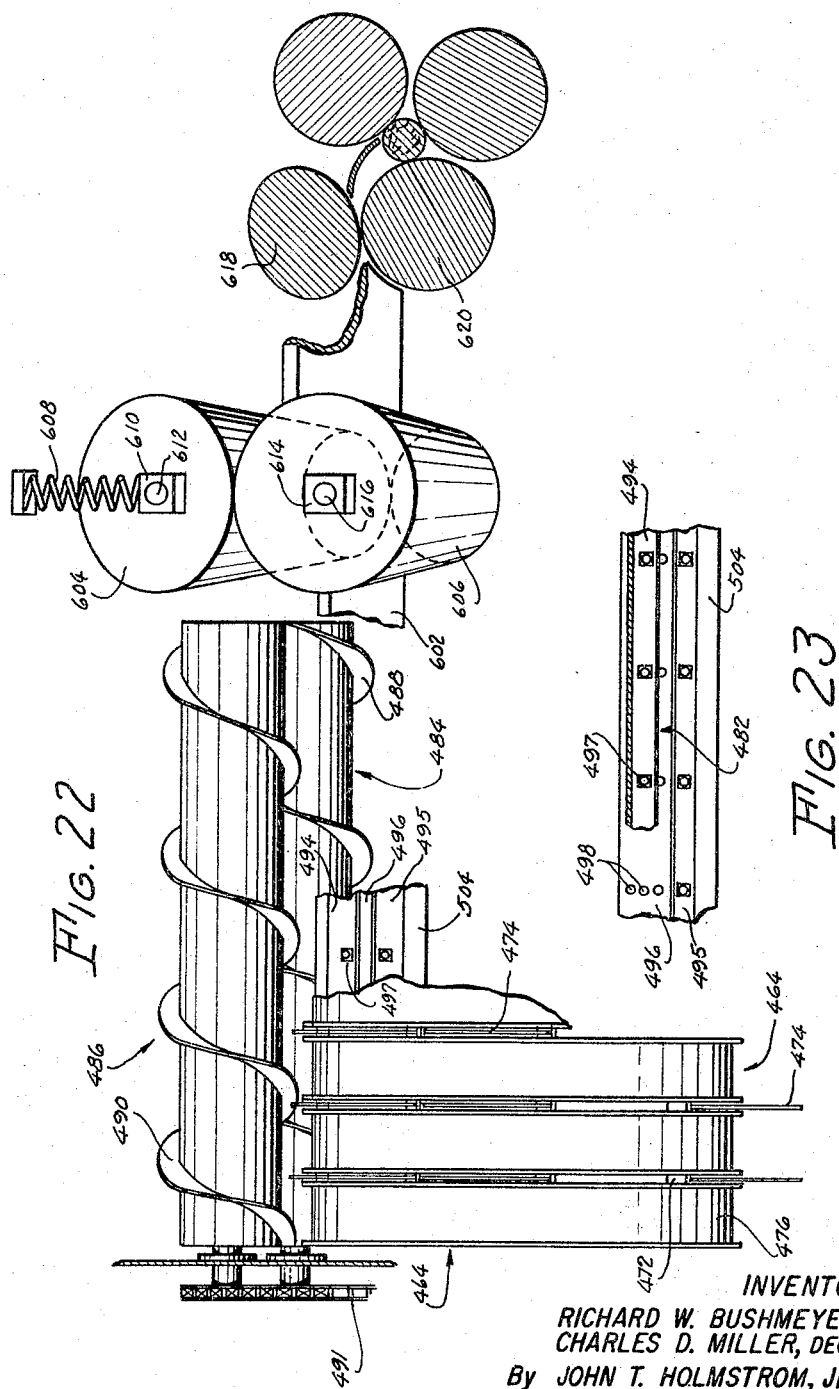

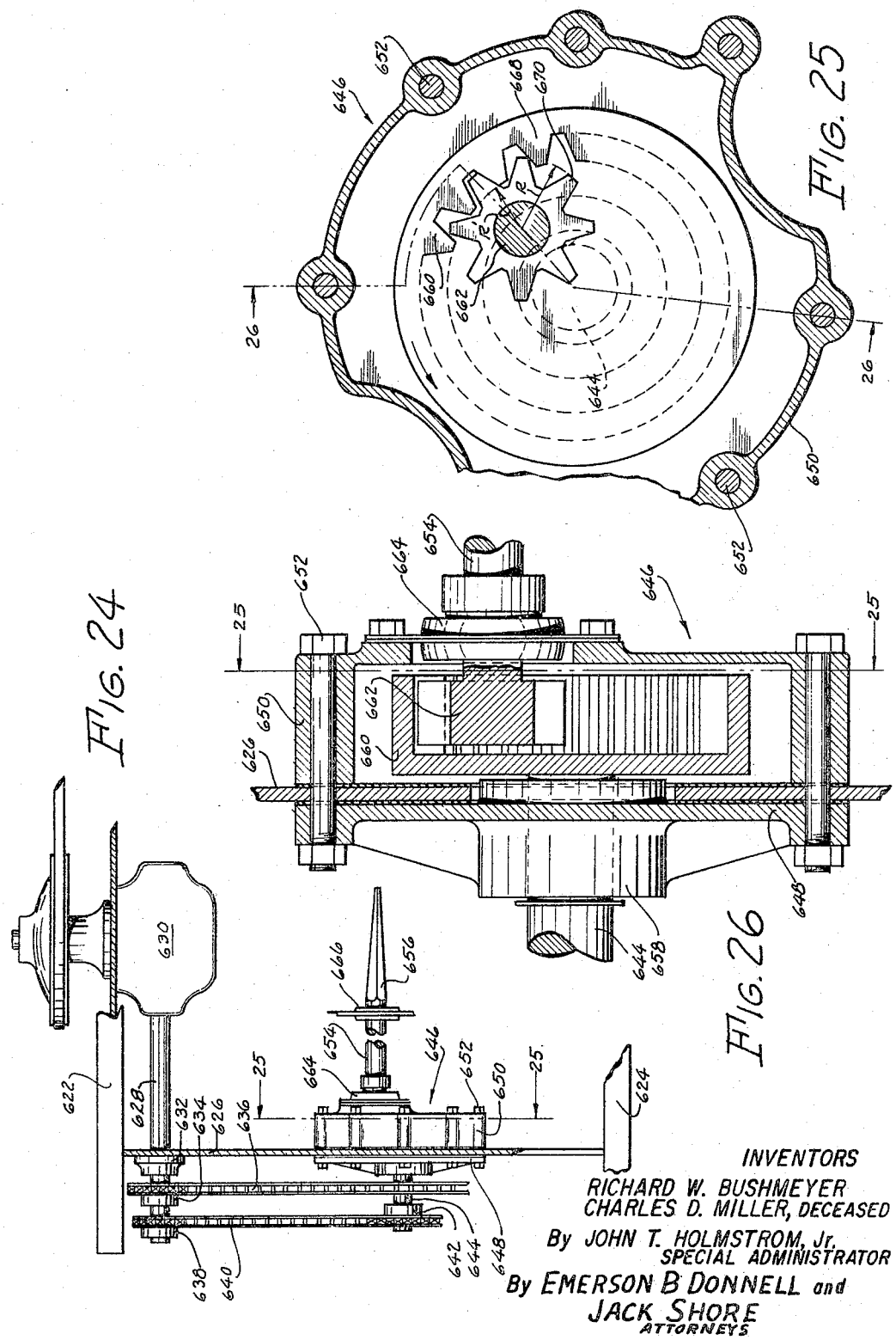

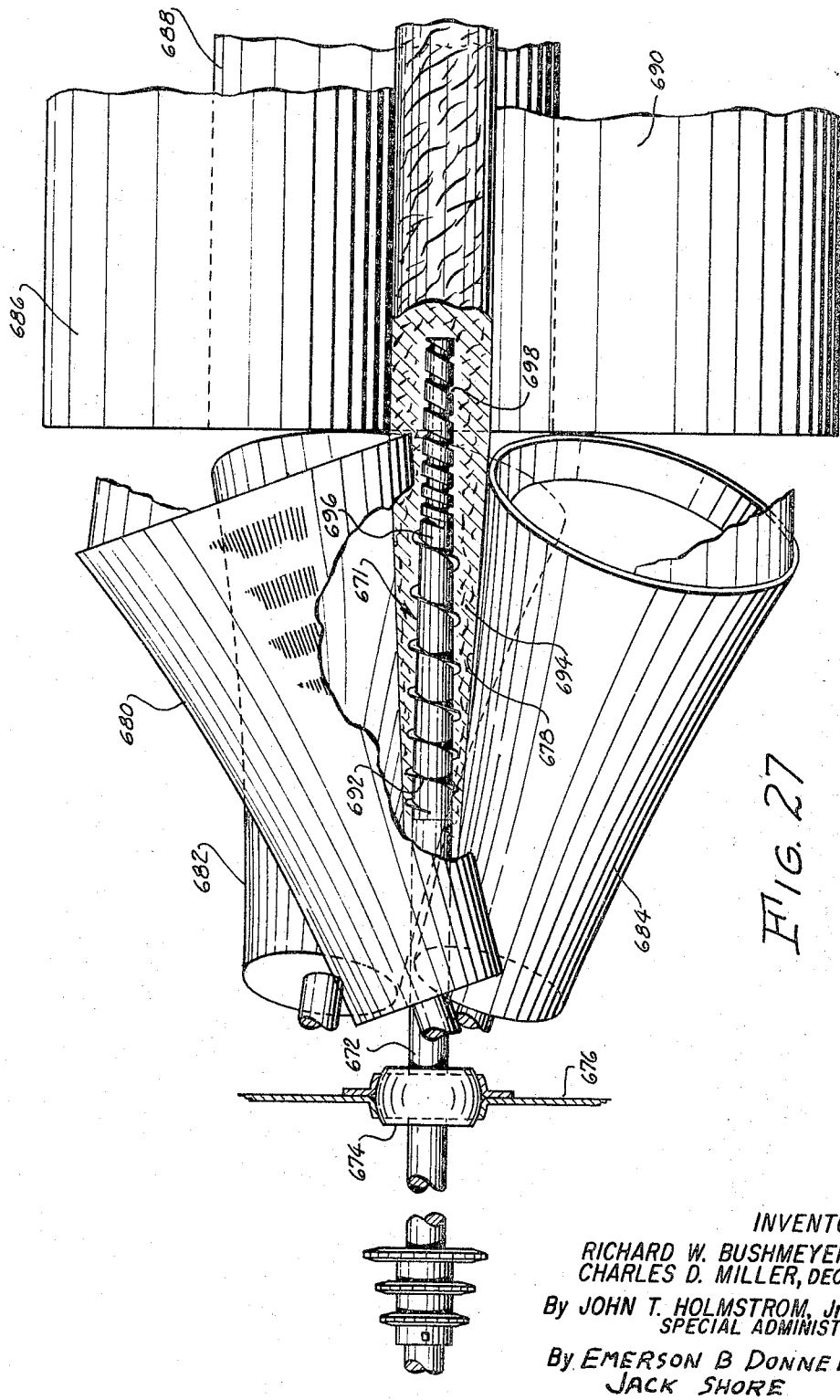

United States Patent Office 3,323,445
Patented June 6, 1967

3,323,445
AGRICULTURAL IMPLEMENT
Richard W. Bushmeyer, Rockford, Ill., and Charles D. Miller, deceased, late of Rockford, Ill., by John Holmstrom, Jr., administrator, Rockford, Ill., assignors to J. I. Case Company, a corporation of Wisconsin
Continuation of abandoned application Ser. No. 287,175, June 10, 1963. This application Mar. 25, 1965, Ser. No. 445,845
32 Claims. (Cl. 100—86)

The present invention relates to field apparatus for collecting and compressing forage or other fibrous material into a densely compacted elongated roll, and subsequently cutting the roll into individual, compact bodies, and this is a continuation of the application of Richard W. Bushmeyer and Charles D. Miller, Ser. No. 287,175, filed June 10, 1963, now abandoned.

The forming of hay or other forage material into compact bodies, generally known as pellets or wafers, has been performed heretofore by large, complicated, stationary machines that require large amounts of power and are not adaptable to operation in the field. There have been some field pelleters produced, but these generally speaking, are large, extremely heavy, and require such great amounts of power that separate engines are invariable necessary, which of course adds further to the weight. Such machines have als obeen extremely complicated and expensive. Furthermore, these machines have not been able to handle the material at a rate commensurate with their high cost, and therefore have not been readily acceptable to farmers or other users. Furthermore, the pellets formed by such machines have generally been composed of a mass of very short pieces of fiber or crop material, and are generally unfamiliar to livestock, and unpalatable. Some pellets of this nature tend to crumble in time, after which there remains a mass of very small fragments which are not convenient to handle by the same mechanism which would ordinarily be provided to handle the pellets.

In accordance with the present invention, there is provided an apparatus which incorporates a feeding mechanism capable of picking up fibrous material from the ground, orienting the fibers in a prescribed manner, and directing them into a compressing roller apparatus which receives the material into a space between the rollers and forms it into a densely compacted roll, winding the material on a rotating spindle between the rollers if desired. It is contemplated that for some conditions, the machine could be adapted to also cut the crop from the ground in the first instance. As the material is compacted, it is also thoroughly intertwined and ejected from the space between the rollers, to a suitable cutting mechanism for cutting the roll into bodies of desired length. The process is continuous, and thus the machine is capable of handling a large quantity of hay, forage or other fibrous material in a relatively short time.

The formation of the roll and subsequent pellets is accomplished with relatively low pressure by an interweaving action of the strands of material so that the pellets will have substantial body and will stay together when they are subsequently handled. In view of the rolling and interweaving action, the individual fibers in each pellet can be longer than the pellet itself, and the pellets are self-supporting and stable enough for mechanized handling by ordinary, conventional machinery, thus it is not necessary that the material be chopped or preprocessed before being used in the machine.

Pellets of this nature, if they should unwind for any reason, will result in a residue of relatively long fiber or straw, which is readily handled by an ordinary conveyor, hay fork, or other expedient, and which is familiar and inviting to the animals.

In view of the nature of the process performed by this machine, and the lack of any requirement for very extreme pressure or compression of the fibers, the apparatus can be relatively light in weight, and require only moderate power. As a further result of these conditions, the machine may be composed of easily fabricated parts which are conservatively stressed, and have an extended life expectancy.

Illustrative embodiments of the machine are described in the following specification and shown in the drawings, in which:

FIG. 1 is a plan view of a machine embodying the invention, shown coupled to a tractor, parts being broken away and others omitted to avoid confusion.

FIG. 2 is an enlarged vertical sectional view taken on the line 2—2 of FIG. 1, with parts broken away.

FIG. 3 is an enlarged exploded perspective view, illustrating the manner of forming a core of crop material.

FIG. 3a is a plan view of one of the forming rollers, diagrammatic in character, and illustrating the combined circumferential and axial movement of the crop core.

FIG. 4 is a plan view of certain forming and finishing rollers, with parts broken away, and with supporting and driving mechanism omitted.

FIG. 5 is an enlarged plan view of portions of the forming rollers indicated in FIG. 4, with parts broken away, illustrating the core forming space which exists between said rollers, and also illustrating a spindle which may be used in the forming process.

FIG. 6 is a sectional view diagrammatic in character, generally axially of the core of crop material, illustrating the formation thereof, and the cutting of the core into short sections or pellets.

FIG. 7 is a fragmentary view on a reduced scale partly in section on line 7—7 of FIG. 1.

FIG. 8 is an enlarged vertical sectional view taken on the line 8—8 of FIG. 1.

FIG. 9 is an enlarged fragmentary vertical sectional view taken on the line 9—9 of FIG. 1.

FIG. 10 is an enlarged plan view of the forming and finishing rollers and their drive mechanism indicated in FIGS. 1, 3, 4, and 6, with parts broken away and others omitted.

FIG. 11 is an enlarged sectional view of a detail taken on the line 11—11 of FIG. 10.

FIG. 12 is an enlarged detail of the forming and finishing rollers shown in FIG. 10, with one of the sets of rollers in horizontal axial section to show the drive to the finishing roller, parts being omitted and others broken away to show what lies beneath.

FIG. 13 is an enlarged rear elevation of a portion of the machine showing part of the feeding mechanism in section on the line 13—13 of FIG. 1, with parts broken away and others omitted.

FIG. 14 is a vertical sectional view on the line 14—14 of FIG. 13.

FIG. 15 is a front elevation of a fragment of the machine showing an adjusting means for the finishing rollers.

FIG. 16 is an enlarged side elevation of the cut-off mechanism, with parts broken away.

FIG. 17 is a plan view of the cut-off mechanism, with parts broken away.

FIG. 18 is a vertical sectional view on the line 18—18 of FIG 10, with one of the forming rollers omitted, showing a combined scraper and crop deflector.

FIG. 19 is a vertical sectional view illustrating the relationship between the finishing rollers and cutter, substantially on the line 19—19 of FIG. 16, with parts broken away and others omitted.

FIG. 21 is a fragmentary vertical sectional view with parts omitted and others broken away, of a modified form of feeding mechanism applicable to a machine of the character described.

FIG. 22 is an enlarged fragmentary front view of this modification with parts omitted and others broken away.

FIG. 23 is a fragmentary sectional view on the line 23—23 of FIG. 21.

FIG. 24 is a fragmentary plan view of the construction indicated in FIG. 10 with parts omitted, and showing a modified form of spindle drive.

FIG. 25 is an enlarged sectional view on the line 25—25 of FIG. 24.

FIG. 26 is a sectional view on the line 26—26 of FIG. 25.

FIG. 27 is an enlarged fragmentary plan view similar to FIG. 5, of a portion of a machine of the type disclosed with parts omitted and using a modified type of spindle.

Similar reference characters have been applied to the same parts throughout these drawings and the following specification, which show and describe a preferred embodiment of the invention.

*General description and theory*

Figure 20:
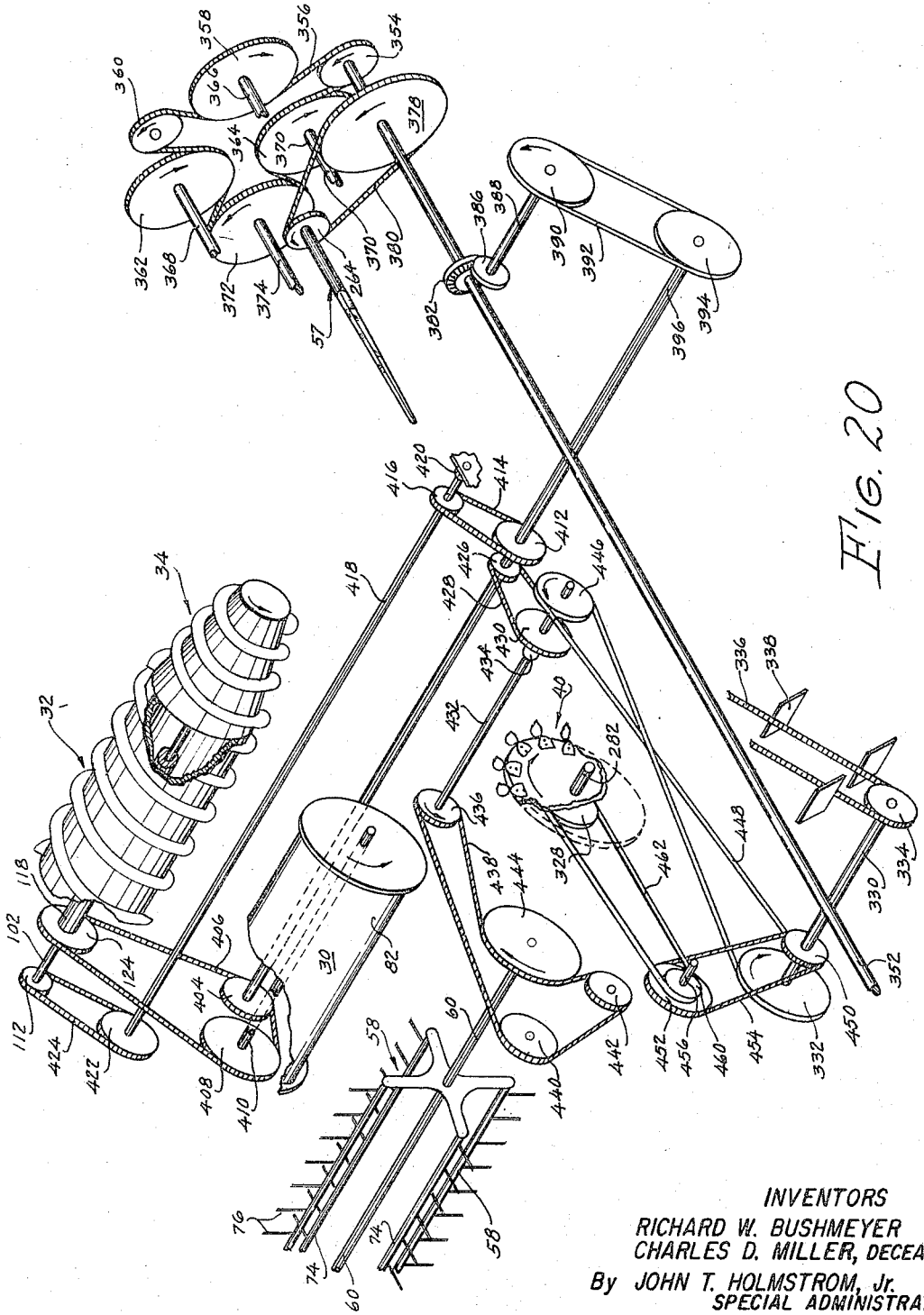
FIG. 20 is a perspective view in the nature of a diagram illustrating the transmission of the drive from the input shaft to the various departments of the machine.

Referring to FIG. 1, the machine in the present instance is drawn behind a tractor 20 by means of a drawbar 22 connected to an A frame or the like 24 forming part of the machine, the whole being supported on drawbar 22 and ground engaging wheels 25 and 26. The mechanism is driven in the illustrative embodiment by means of a power take-off, generally designated as 27, actuated by the tractor in well-known manner, and which drives the several elements or departments of the machine through mechanism which will be described in detail. It is to be understood that other sources of power, such as an engine mounted on the pelleter, are contemplated as suitable and within the scope of the invention.

Briefly, the crop material to be treated or formed into rolls or pellets is gathered from the field by means of a pickup, generally designated as 28, the crop having previously been harvested by any suitable cutting mechanism. The cut crop is then passed by the pickup to a beater 30, which "combs" the material, tending to arrange the fibers to extend in a common direction to a feeding auger 32. Auger 32 further "combs" the material and transmits it to a coaxial and faster running auger 34 which continues the motion of the material, still further "combs" it, and feeds it into a chamber formed between a plurality of specially shaped continuously rotated rollers, which will be more fully described, one of which is indicated at 36.

The crop material is formed by the rollers, preferably with the assistance of a rotatable spindle between the rollers, into a dense rapidly rotating core, although it is to be understood that the invention is not limited to the use of a spindle. The core is given a rapid and powerful axial movement in the direction of the tractor in FIG. 1, by reason of the rotation, shape and positioning of these rollers. The core of material is expelled into a chamber formed by a plurality of circumferentially spaced finishing rollers, one of which is indicated at 38. The material is forced along the length of the finishing rollers by the material coming from behind, and part way along the length of the roller 38 it is cut into desired lengths by means of a cutting device or wheel 40.

The short lengths of the core of crop material are forced along the remaining length of the finishing rollers by the following material and expelled into a hopper or chute 42, from which they are picked up and taken by an elevator 44 to a trailing vehicle or other point of disposition.

Crop material may be compacted into a roll or core if it is introduced between a group of circumferentially spaced parallel rollers which are rotated in the same direction. Such a core may be caused to move lengthwise of the rollers by mounting them so that they are skewed in relation to each other. By "skewed" is meant mounting so they are non-parallel and non-intersecting. In other words, the rollers are mounted so that the planes of the axes of any two thereof intersect in most positions, but in one position are parallel to each other. To put it another way, the axes of the rollers cross each other but in spaced relation.

The rollers are clustered about a core forming chamber in such a position that the ends of their axes adjacent the exit end of said space, are circumferentially displaced about said chamber in the direction that the rollers are intended to turn.

The skewing relationship of the rollers hereinabove set forth will develop a very powerful and positive force tending to cause expulsion of the core axially thereof from said core forming chamber. The angle of skewing will determine the rate at which the core is expelled, given a predetermined speed of rotation of the core forming rollers. The angle of skewing is defined as that angle between the axis of the core and the axis of one of the wrapping rollers, when both core and wrapping roller are projected in a true pane. In order to obtain rapid movement of the core, the angle of skewing of the rollers will have to be substantial, as for example, something on the order of 5 to 20 degrees. It is to be understood that the rollers can be rotated at an increased rate with an attendant decrease in the angle of skewing, and still obtain rapid expulsion of the core. The skewing angle, speed of rotation of the core forming rollers, and the diameter of the roll can be varied in any manner desired to obtain the desired characteristics of operation.

If cylindrical or similarly shaped rollers are used, the angular velocity of the core will vary from point to point axially of the core. This is undesirable because it will tend to twist and break the core. Furthermore, cylindrical rollers skewed in this manner become too far apart at their ends, with the result that there is excessive space between the rollers through which material can escape. For this reason, the rollers are made gradually larger toward their ends thereby providing favorable velocity ratios and also closing the undesirable spaces. This results in the formation of a small diameter mid section and enlarged end sections. It is desirable to utilize such rollers mostly from the region of their smallest diameters toward their largest diameters, when rotated so that the crop traverse toward the large ends of the rollers. Therefore, the rollers are formed in the present illustrative machine, in a flared configuration progressing from a minimum diameter at one end to a maximum diameter at the other. The direction in which the rollers rotate determines the direction of progress of the core, and the rollers are rotated so that the core moves out from between them at the discharge end of the chamber, adjacent the large ends of the rollers.

The foregoing arrangement substantially avoids sliding of the crop in relation to the forming rollers, and also avoids twisting of the core. In other words, the particles will be moving at substantially the same angular velocity throughout the length of the core which prevents the twisting and breaking of the fibers and attendant reduction in the strength of the pellets. Also, it is advantageous to have the core forming chamber flared toward its exit end to accommodate the increasing cross section of the core as it has material added to it in its passage along the length of the rollers. For the most accurate rolling action on the crop core, use is made of the principle of the hyperbolic curve, but it is contemplated that various configurations of the core and rollers may be used to approximate this desirable action.

If a cluster of cylindrical rollers is skewed as herein described, the space between them defined by their innermost elements, will be hyperboloid, or body of revolution formed by a hyperbola rotated about its indefinite conjugate axis, which axis is congruent with the aforesaid chamber. A crop core rolled in such a chamber with cylindrical type forming rollers would be rotated faster in the narrow part of the space than it would in the wider part of the space. This would impart an undesirable twist to the core because the tangential velocity of the surfaces of the cylindrical rollers woud be the same from end to end, whereas the tangential velocity of a rotating core of the shape described would be greater at the large ends than at the relatively small middle portion. Enlargement of the rollers at their exit ends would tend to remedy this defect, since the enlarged ends would have a greater tangential velocity than the smaller sections of the rollers. Preferably a rate of curvature and enlargement is used, such that the ratio of the diameters of the core and the rollers is the same at any point in the length of the core forming space. In this way, the surface speeds of the core and the rollers are the same throughout the length of the chamber, and the core has a true rolling contact with the rollers. It is therefore formed by a wrapping action, there being substantially no twisting of the core and substantially no sliding thereof in relation to the forming rollers.

Hyperboloids, for use in the above relations, have certain unique properties in that the elements of the curved surfaces are straight lines; a hyperboloid being a solid figure defined by a straight line revolving about a nonparallel axis with which it does not intersect. In other words, the straight line which generates the hyperboloid surface crosses the axis but in spaced relation thereto, and revolves around the axis at a fixed distance or radius therefrom.

Since the surfaces of hyperboloids are composed of straight lines, it follows that two hyperboloids can be placed with their curved surfaces together in such a way as to make a straight line contact with each other, the axes of the two hyperboloids, of course, being spaced from each other at their nearest point to the extent of the combined radii of the smallest sections of the two bodies, and angled to the extent that the larger sections of the bodies are also in contact. When this is done it will be found that the points of contact between the hyperboloids define a straight line which is an element common to the two bodies.

If three or more hyperboloids, each having an individual axis, are properly clustered or assembled about a common axis or center line, their innermost straight line elements will be the same distance from the common axis and equally angled with respect to it. Revolving any one of the innermost straight line elements about the common axis will define a space which is in the shape of a hyperboloid whose axis is coincident with the common axis of the assemblage. The space defined in this manner is the approximate shape of the hay core formed between the rollers of the machine. The space so occupied by the hay core is termed the forming chamber. Such a core, or the chamber available for it, would be restricted at its mid portion as compared with its ends. The core would tend to move in one direction throughout its length, as will be explained, and if it is desired to avoid compressing the hay by passing it from a larger to a smaller part of the space, the rollers may be, and preferably are discontinued at or close to their smallest diameter, and only sections of increasing diameter toward the exit end of the core forming space are used, so that all of the reaction force exerted by the rollers on the core will be in the same direction.

The application of this principle is well shown in FIGS. 5 and 6. In these views, the core is being formed in a space or chamber 46 generally in the configuration of one-half of a hyperboloid, and is rotating toward the observer, or counterclockwise as seen from the right. The core is designated as 47, and is moving axially in the direction indicated by the arrow 48, or toward the larger ends of the rollers.

The manner in which the core is formed is well shown in FIG. 3, it being understood that the forming rollers and the finishing rollers are shown separated in this diagrammatic view, whereas the forming and finishing rollers in the actual machine are placed as close together as possible so that there is no appreciable space between them where the core is unsupported. The crop material is fed between the rollers transversely of core 47, as indicated by arrows 49. The actual relations of the various rollers to each other are well shown in FIG. 4, and the means by which the parts are supported in these relations are shown elsewhere in the drawings and will be fully described. It will be clear that the action of the rollers 36, 50, and 52 will be to roll the crop material into a mass of rotating, generally helically and spirally arranged compacted fibers, and to positively and rapidly expel the rotating mass axially of the space between the rollers. Furthermore, by reason of the fact that the aforesaid ratio between the diameters of the rollers and core is constant, there will be a true rolling contact between the rollers and the core throughout the line of contact therebetween, and also the core will be caused to rotate the same number of turns at one end as at the other, in a given time. There is therefore no twisting of the core, but a simple building up of the fibers as they are wound on each other, and a compacting and positive expulsion of the mass.

Rollers 36, 50, and 52, preferably have their surfaces slightly roughened, as by knurling as seen at 53, FIG. 5, to ensure good frictional grip on the crop material. A resiliently mounted fourth roller 54 is placed, in the present instance, generally above roller 52 and is preferably another hyperboloid of suitable configuration and so positioned that it can make a line contact with roller 52. Roller 54 is primarily for feeding the crop material as will further appear. Rollers 36, 50, and 52 are rotated in a common direction, while roller 54 is rotated in the opposite direction, or toward the observer in FIG. 4. The resulting bite between rollers 54 and 52 is utilized to feed crop material into the space between rollers 36, 50, and 52, as will be described in detail.

As seen in FIG. 7, crop material 56 coming from auger 34 is caught in the bite between rollers 52 and 54, and propelled generally to the right into the space between rollers 36 and 52, which space is more generous than that between rollers 36 and 50 and between rollers 50 and 52 respectively.

To assist in starting the desired winding of the crop material, and also to assist in controlling the axial movement of core 47, a spindle generally designated as 57, FIG. 5, occupies a substantial portion of the center of the core forming space 46, and in the illustrative embodiment is rotated at substantially the same rate as the core. The presence of spindle 57 produces a void within core 47 which, even if filled by inward expansion of the core of crop material when it is stripped off of spindle 57 by the action of the rollers, will remain as a central region of less density than would be the case if spindle 57 were not present. In this way, a hard central core within the resulting pellets is avoided, and it is contemplated that pellets could be made by this process in which the void would persist to the extent that the pellets would have actual openings therethrough. Such openings would be valuable in furnishing ventilation and in drying pellets which might have been made from excessively moist crop material.

*Pickup and feeding mechanism*

Returning to a more detailed description of the mechanism, pickup 28 comprises a generally horizontal cage or cylinder, generally designated as 58, FIG. 2, rotatable on a shaft 60, journaled in bearings as 62, only one of which is shown, carried on supporting arms 64. Arm 64 is carried on a pivot 66 supported on the machine structure in any suitable manner, and is urged in an upward direction by a spring 68 anchored at 70 and pulling on an arm 72 fixed to arm 64. In this way, substantially all of the weight of cage 58 is supported by arms 64. Cage 58 includes a plurality of bars 74 substantially parallel to shaft 60, to which are secured rake teeth 76. Teeth 76 extend outwardly between stripper plates 78, while cage 58 rotates in a counterclockwise direction, as seen in FIG. 2. In this way, crop material is picked up from the ground in well-known manner and passed backwardly over a platform 80. It is contemplated that a cutter bar of any suitable type may be positioned to cut crop material directly from the ground and feed it onto platform 80. Material passing over platform 80 is engaged by the wings 82 of beater 30 which is arranged substantially parallel to pickup 28 and which rotates in a clockwise direction above platform 80, agitating the material and tending to arrange the individual fibers thereof in a common direction. Beater 30 also impels the material forcibly backward into engagement with auger 32.

Auger 32 is arranged rearwardly of and somewhat below beater 30 and comprises a shell or body portion 84 (see also FIG. 7) about which is fastened in the present instance, a pair of strips 86 and 88 arranged helically to form a flighting for the auger. It has been found desirable to make the flighting relatively narrow or low in comparison to the diameter of the auger shell 84, the flighting in the illustrative embodiment shown, for example having a height of about one-tenth of the diameter of shell 84, and the pitch, or spacing of the strips being increased gradually toward the exit end of the auger or toward the right in FIG. 7. Auger 32 engages the crop material, continues the arranging or straightening action and impels the material lengthwise of itself at a constantly increasing velocity.

Auger 34 adjoins auger 32 at the exit end thereof, and has a conical shell 90 about which are arranged strips 92 and 94 spirally and helically disposed to form flighting for auger 34. Again, it has been found desirable that the flighting be narrow as compared to the diameter of shell 90.

Auger 32 is disposed in a trough or housing 96 constituting a continuation of platform 80 and formed as a part of a feeder housing 98, being part of the structure of the machine and enclosing the auger, except at the front, while auger 34 is entirely enclosed in a housing or shroud 99 conforming closely to the outer margins of the flighting 92–94. Shroud 99 terminates in a delivery channel 100 directed toward the bite between above-mentioned rollers 54 and 52. As will be apparent, in order to compress a forage crop at a rate which will be commercially desirable, a great deal of material must be handled by these augers in a comparatively short time. For this reason, auger 32 runs at a relatively high rate of speed, on the order of 600 r.p.m., while auger 34 operates at a much higher speed, on the order of 2000 r.p.m. Also, strips 92 and 94 forming the flighting for auger 34 increase in their pitch or spacing toward the outlet end of shroud 99, the overall effect of the beater and the two augers being to reduce the mass of forage material to a relatively small cross section but flowing at a very high rate through channel 100 and between rollers 54 and 52.

Such a feeder assemblage, as may occur to others skilled in the art, could have utility in connections other than that shown such as with a baler or forage harvester, inasmuch as crop material handled by the device would emerge from shroud 99 in a relatively compact stream and at a velocity sufficient to project itself a considerable distance.

The increasing pitch of the flighting on both augers tends to cause uniform acceleration of the crop mass after it leaves beater 30 to the high velocity necessary at delivery channel 100. By this mechanism, the material is delivered in small enough compass to be fed between the rollers, but nevertheless, at a high rate so as to result in a large enough capacity for the machine.

The relatively high speed of auger 34 within shroud 99 acts to propel a blast of air through shroud 99 and along delivery channel 100, which further assists in presenting the crop forcibly into the bite between rollers 54 and 52.

Auger 34 is fixed on a shaft 102, as seen in FIG. 13, journaled in a bearing 104 and also in a bearing 106; bearing 104 being carried on a plate 108 forming a part of feed housing structure 98, while bearing 106 is carried on a plate 110, forming part of such structure remote from plate 108. Shaft 102 has a sprocket 112 from which it is driven, as will be later described. Auger 32 includes within shell 84, supporting members 114 and 116 fixed on a sleeve 118 journaled on shaft 102, in the present instance by bearings 120 and 122. In this manner, auger 32 may rotate independently of and at a different speed than auger 34. Sleeve 118 extends beyond the end of shell 84, remote from auger 34 and has a sprocket 124 fixed thereon through which auger 22 is driven, as will be further explained.

As heretofore stated, auger 34 receives crop material from auger 32, and therefore plate 108 is cut away or slotted to provide an opening 126 extending most of the way about the periphery of auger 32, through which the material may pass from auger 32 to auger 34 (see also FIG. 14).

From auger 34, the crop material is fed into the bite between roller 52 and charging roller 54.

While the similar rotation of forming rollers 36, 50 and 52 tends to move the crop material axially in a common direction, as explained in connection with FIG. 3a, hereinbefore, the remaining roller or charging roller 54 (rotating in the opposite direction) tends to move the crop material axially in the opposite direction.

It is to be noted that the curved surfaces of rollers 54 and 52 will not lie in contact with each other unless the axes of these rollers are skewed at a considerable angle to each other. This angle is such that when the large end of roller 54 is placed on top of the large end of roller 52 (as in the present machine) the small end of roller 54 will be positioned alongside the small end of roller 52. This relation is shown in FIGS. 4 and 10. By so disposing these rollers, a line of contact is established between the curved surfaces. However, the surfaces of rollers 52 and 54, while normally in or substantially in such line contact with each other, provide a combination rolling and sliding contact because of the aforesaid skewing of their axes and their fixed axial relationship. Thus, while the crop material in contact with roller 52 is impelled axially of the roller in one direction, said material also in contact with roller 54 is impelled at the same time in the opposite axial direction so as to receive a scraping or lacerating action as it passes betwen the rollers. Furthermore, roller 54 is pressed, by mechanism to be described, forcefully toward roller 52; in fact, with sufficient force to crush or partially crush some of the fibers or other parts of the crop. This will liberate certain moist constituents, including protoplasm which will be immediately distributed among the incoming fibers, leaves, etc. During the following rolling operations, this material will be well blended with the intertwining fibers which it will tend to cement together. It thus will become a binding agent and render any other binding expedient unnecessary for the pellets or crop rolls being produced.

In order ot prevent any adhering of the crop material to charging roller 54, a scraper and deflector blade 128 is suitably supported from plate 129 and 130 FIG. 10, in the space between rollers 36 and 52. The blade 128 has a sharp edge 131, FIG. 18, which scrapes the surface of roller 54 to remove any material adhering to roller 54. Since charging roller 54 is preferably one-half of a hyperboloid, the elements of its surface are straight lines, as heretofore explained, and edge 131 is conveniently made straight and disposed at an angle such as to lie in contact with roller 54 throughout its length. All of the material is guided by scraper-deflector 128 through the space between rollers 36 and 52 so as to be caught and rolled into a core 47 between rollers 36, 50 and 52.

The forming and finishing rollers

Rollers 36, 50, and 52, as hereinbefore stated, are arranged in a cluster. The rollers are formed with a flared or gradually enlarging configuration, preferably each in the form of substantially one-half of a hyperboloid, this relation being well shown in FIGS. 4 and 10, and their axes recede from each other in the direction of the large ends of the rollers. Inasmuch as the flared rollers necessarily place their axes at a relatively wide spacing adjacent the large ends of the rollers and at a relatively close spacing adjacent the small ends of the rollers, the ends of the forming rollers where the axes thereof are closest to each other will be referred to as the proximal ends, and the opposite ends of the forming rollers where the axes thereof are more widely spaced will be referred to as the distal ends of the forming rollers. It is nevertheless true that the rollers, when placed together in a cluster as disclosed, position their axes as close together as possible while allowing necessary clearance to permit relative movement. The axes of rollers 36, 50 and 52 are also skewed, or displaced at the large ends of the rollers circumferentially of the space between the rollers in the direction in which the rollers are to be rotated. When the rollers are so operated, material introduced into said space will be rolled and advanced axially out of the space between and in the direction of the large ends of the rollers, as hereinbefore described, so that the point where the material leaves said space may be termed the exit end of said space.

Above-mentioned finishing roller 38 forms a continuation of forming roller 36. In like manner, a finishing roller 132 forms a continuation of above-mentioned roller 50, while a finishing roller 134 forms a continuation of above-mentioned roller 52. Furthermore, forming rollers 36 and 52 are spaced apart a greater distance than rollers 36 and 50 on the one hand, and rollers 50 and 52 on the other. In like manner, finishing rollers 38 and 134 are spaced from each other more than they are from their companion roller 132. This provides an opening leading into the space between these groups of rollers for feeding and separating purposes, as will appear.

It is desirable that the surfaces of the forming rollers shall be substantially continuous with those of the finishing rollers. However, in the structure illustrated, the axes of the forming rollers are disposed at substantial angles to those of the finishing rollers. For supporting and driving these pairs of rollers, resort is had to a plate 135 carried in any suitable manner on a cross member 136 and supporting a bearing shell 137, best shown in FIG. 12, plate 135 constituting an end support for the rollers. Bearing shell 137 carries a shaft 138 on which is fixed above-mentioned roller 36.

Since the several forming rollers are all supported in a manner similar to roller 36, it will be necessary to describe only one in detail.

Shaft 138 is also supported in a bearing of suitable type 140 which is carried in a housing generally designated as 142, carried on a frame element 144 constituting another end support for the rollers. Frame element 144 also carries a bearing 146 which supports a shaft 148 forming an axle or support for above-mentioned finishing roller 38, a web 150 connecting the axle and the outer portion to form roller 38. Frame member 144 includes a gear housing portion 152 in which bearing 146 is mounted in any well-known manner, and a similar gear housing 154 is also carried by frame member 144 spaced from gear housing 152 circumferentially about the core forming chamber and carrying a bearing 156 for supporting above-mentioned finishing roller 134. A similar bearing housing and parts, not visible in FIG. 12, supports finishing roller 132. The several gear housings are arranged about the periphery of frame member 144, but are spaced apart to provide an opening at the center thereof to permit the passage of the core of crop material and to provide for the approach of the rim of roller 36 close to the edge of roller 38 to form a substantially continuous support for said core in its passage from between the forming rollers to the space between the finishing rollers. The angular disposition of each of the other forming rollers 50 and 52, as related to its corresponding finishing roller, results in an approach or substantial tangency of the ends of each of the forming rollers with its corresponding finishing roller at one point in their circumference. On the other hand, at the opposite point in their circumference, there is ample space for frame element 144 to extend outwardly of the set of rollers to be supported on any convenient portion of the machine structure as 157, through flange portions 158 and 159.

Roller 36 is driven from a universal joint shaft, generally designated as 160 which is connected with above-mentioned shaft 138. Within housing 152 shaft 138 has a gear 161 which meshes with and drives a similar gear 162 fixed on shaft 148. In this manner, shaft 138 drives shaft 148 so that roller 38 is driven in synchronism with roller 36.

Roller 36 has a cavity 163 to receive housing 142, and housing 142 has a rim or wall 164, substantially closing the opening against entrance of undesired material.

Roller 52, as stated, is mounted in a substantially identical manner, is driven by a joint shaft 166, and drives above-mentioned roller 134 through gears 168 and 170 in a housing 172. Substantially identical construction is used to support and connect rollers 50 and 132, roller 50 being driven by a universal joint shaft 174 (see also FIG. 10).

Charging roller 54 is carried at its small end by a bearing 175 supported on a depending arm 176, which is in turn fixed to a torsion rod 178 extending diagonally across the upper portion of the machine, generally above roller 36. Torsion rod 178 is journaled in a bearing 180 fixed on a member 182 forming part of the frame of the machine, and in a bearing 184, in the present instance mounted on frame element 144. Roller 54 is carried at its large end on a bearing 186 supported on a substantially horizontal arm 188 also fixed to torsion rod 178. Rod 178 is also supported and journaled in a steady bearing 190 fixed to above-mentioned plate 135. A lever arm 192 is fixed to torsion rod 178 adjacent bearing 190, and extended radially therefrom to a tension member or bolt 194 (see also FIG. 11) engaged with an upper flange portion 196 of frame member 157. Tightening of a nut 198 will raise bolt 194, swinging arm 192 upwardly and turning torsion rod 178 in the region between arms 176 and 188. Such turning will tend to swing arm 176 and shift bearing 175 toward the side of roller 52. At the same time, such turning will tend to swing arm 188 and shift bearing 186 downwardly toward roller 52. Bearings 175 and 186, however, cannot move since they are connected to roller 54, which is fixed in relation to roller 52. Adjusting movement of lever arm 192 therefore introduces a twist or torsional distortion into rod 178, which tends to continually urge arms 176 and 188 toward roller 52, and thereby urge roller 54 with resilient pressure against crop material between itself and roller 52. The amount of pressure is adjustable by manipulation of nut 198, to obtain more or less crushing of the crop material, as desired.

If excessive amounts or slugs of material are introduced between rollers 52 and 54, roller 54 may be forced away from roller 52 by the material, which action is permitted by further twisting of torsion rod 178. It will be understood that the latter is made of suitable resilient material capable of acting as a torsion spring. In other words, it will not be permanently twisted, but will continuously tend to untwist and urge roller 54 resiliently toward roller 52.

Arm 188 has a lug 200 extending over frame member 144 and carrying an adjusting screw 202. Screw 202 may be adjusted downwardly into contact with frame member 144 to limit downward movement of arm 188 and thereby establish a minimum clearance between the large ends of rollers 54 and 52 if desirable. Arm 176 has a stud 204 fixed thereto, extending through a bracket 206 fixed in any suitable manner with the frame of the machine, stud 204 having a nut 208 which may be adjusted to engage bracket 206 and limit the approach of the small end of roller 54 to roller 52.

Plate 129 is fixed to arm 176 by means of bolts 210 and 212 FIG. 18, so that scraper 128 may be adjusted toward and away from the small end of roller 54, bolts 210 and 212 being arranged in slotted holes in plate 129. Arm 130 extends generally upwardly and has a flange 214 fixed to a web 216 forming part of arm 188. Flange 214 is secured by bolts 218, arranged in slotted holes so that scraper 128 can be adjusted toward and away from the large end of roller 54.

A front wall portion 220 is joined to wall portion 157 to form part of the structure of the machine, as more particularly shown in FIG. 12, and carries a bearing of suitable type 222 in which is journaled above-mentioned shaft 148. In this way, the end of roller 38 remote from roller 36 is supported for rotation. In similar manner, a bearing 224 is carried on wall portion 220 and supports a shaft 226 forming a part of roller 134. Generally beneath and between bearings 222 and 224, wall portion 220 provides a slot 228, best shown in FIG. 15. A bearing 230 has outwardly directed guides 232 and 234 which are preferably bifurcated to straddle the edges of slot 228. Bearing 230 carries a shaft 236 forming a part of above-mentioned roller 132 so that the latter may be shifted in position to vary the space between the finishing rollers 38, 134, and 132.

Bearing 230 is urged upwardly in slot 228 by means of a spring 238, engaged with a yoke 240 fixed on wall 220. Spring 238 presses upwardly against a nut 242, fixed on a bolt 244, fixed to bearing 230 by lock nuts 246. Bolt 244 extends downwardly through yoke 240, and has a head 248 which contacts yoke 240 after limited upward movement of bearing 230. The point at which this will take place is adjustable by means of lock nuts 246. Since the bearings for at least the roller 132 are preferably of a type which will tolerate misalignment, it is possible for bearing 230 to be shifted in slot 228 to move roller 132 in the direction to control the effective space between the three finishing rollers. The amount of pressure necessary to displace roller 132 may be adjusted by means of nut 242, while the minimum clearance or closeness of roller 132 to roller 38 may be adjusted by means of lock nuts 246. By means of these adjustments, the resistance of the finishing rollers to passage of the hay core can be controlled. This resistance determines, in part, the density or hardness of the resulting rolls or pellets. Since rollers 38, 132 and 134 are substantially parallel, and not skewed, then is little tendency for them to propel core 47 axially. It is pressed axially by the material coming from forming rollers 36, 50 and 52. The core 47 must slip in relation to rollers 38, 132 and 134. The resulting sliding friction will impose a resistance to movement of core 47 out of core forming chamber 46. This will cause the core to be compressed to a greater density within the forming chamber before it is expelled. If the finishing rollers are parallel, the resistance will amount to a predetermined value. If they converge slightly, as by reason of a raised position of bearing 230, the resistance will be increased, so that the pellets will be harder. If the rollers 38, 132 and 134 diverge slightly by reason of a lowered position of bearing 230, the resistance will be less, and the pellets will be softer.

Plate 220 provides an opening 250 through which the finished pellets are delivered into trough 42.

*The spindle*

There is difficulty sometimes when material is fed into the core forming space, in getting a core or roll to form in the first instance. This is avoided by providing above-mentioned spindle 57, best shown in FIG. 5, and which is extended axially of the core forming chamber, hereinbefore described, and indicated in FIGS. 3 and 6. Spindle 57 is carried in a bearing 254 supported on above-mentioned plate 135, and also in a bearing 256, supported on a plate 258, forming part of the framing of the machine. Spindle 57 is preferably freely slidable through bearings 256 and 254, but prevented from being displaced axially by a collar 260, provided with a set screw 262, and by a sprocket 264 fixed on spindle 57 by means of a set screw 266. In this manner, spindle 57 is maintained in desired axial relation with chamber 46, and when desired it is readily adjusted longitudinally by loosening set screws 262 and 266. Spindle 57 may then be shifted axially to the extent desired after which it is again locked in position by tightening set screws 262 and 266. A suitable drive is extended, as will be described, to sprocket 264, and spindle 57 is rotated in the same direction, and substantially at a speed proportional to that of the forming rollers and which may be the same speed as the crop core forming in chamber 46. The rotation of spindle 57 starts the winding process of the crop fibers immediately upon their entering chamber 46, the core of crop material forming about the spindle and being urged axially by the motion of the roller surfaces against the resistance to sliding of the crop material axially on the spindle. Thus, the spindle acts to hold back the axial movement of the core, and in this way to control the density of the latter as it is formed. The axial force developed by the skewed forming rollers, however, is amply strong to insure movement of the core in spite of the resistance of the spindle. Different crop conditions may dictate different axial positions for spindle 57 to achieve a given core density which, as has been described, are readily obtained by adjustment thereof through bearings 256 and 254.

Spindle 57, in addition to starting the wrapping of the core, is capable of transmitting a considerable amount of power thereto to keep it in positive rotation, even though a relatively thick mat of material is being wrapped, and even though bunches or slugs of material may be entering the machine, and which might tend to interfere with such rotation. Rotation of the core tends to insure proper wrapping and prompt expulsion of the core from the forming rollers.

Spindle 57 is shown as having a square cross section from the region of numeral 268 toward the exit end of chamber 46, and the illustrated form is tapered toward the exit end of chamber 46. However, variations on this cross section are contemplated. It is also contemplated that spindles of different cross section might be substituted for each other to suit different conditions. Furthermore, the space occupied by the spindle 57 will appear in the core as the latter moves axially, as a soft or less dense section in the center of the core so that the harder portion of the core will be the region toward the outer surface. In this way, the core is made to have a dense outer portion for good durability, while the inside is more mellow and tempting to the animals.

When the core is cut into pellets, the soft center provides a ready path for escape of moisture so that the pellets will dry satisfactorily in storage.

By choosing suitable proportions of the parts, it is contemplated that an open passageway may be formed through the pellets by the use of a spindle such as 57.

*The cutoff mechanism*

Cutter wheel 40 comprises a disk 280 fixed in any suitable manner on a shaft 282, and provided with a multiplicity of knives 284, arranged around the periphery of disk 280. Each knife 284 is preferably formed of a strip of suitable material, as best seen in FIGS. 16 and 17, and given a twist so as to have a pad portion 286, and a blade portion 288 which has a sharp cutting edge 290. Edge 290 is preferably curved and presented to the surface of the rotating crop core, as best seen in FIG. 19, the sharp edge presented to the rapidly rotating fibrous material, cutting readily into the same. As any of the knives enters into the moving core, it will be carried along by the axial movement of the core, and thus cause rotation of wheel 40. Such rotation will present the next knife to the hay core which will be carried along as before. This knife will be caught and carried along, presenting the next knife, and so on, the length of the pellets being determined by the choice of spacing between knives 284. This action is well illustrated in FIG. 6.

Knives 284 must be strongly supported to do their work without being deflected into contact with rollers 38 and 134. For this reason, disk 280 is backed up by a dish-like reenforcing member 292, FIGS. 16, 17, and 19, fixed to shaft 282 and united adjacent its rim 294 with disk 280.

Furthermore, cutter wheel 40 may be used under appropriate conditions to either retard or to assist the axial movement of core 46 and the pellets cut therefrom, and for this purpose, it has a drive which will be further described, but which is generally designated as 295.

It is desirable to have cutter wheel 40 removable from the hay core when not in use as a precaution against corrosion or other damage, and for this purpose, shaft 282 is journaled in a sleeve 296 which is in turn eccentrically mounted in a sleeve 298. Sleeve 298 has a collar 300 fixed thereon at the end adjacent wheel 40, and journaled in a plate 302. Plate 302 forms part of a box-like enclosure including side plates 304 and 306. Plates 304 and 306 are shaped to provide shoulders 308 and 310. A plate 312 fixed to side plates 304 and 306 remote from plate 302, forms the other end of the box-like enclosure and has an aperture in which sleeve 298 is rotatably supported. A hand lever 314 is fixed on the end of sleeve 298 just beyond plate 312, by suitable means as bolts 316, and which in one position, rests upon shoulder 308 and determines the working position of the cutter wheel. When it is desired to raise the knives 284 out of the crop core, lever 314 is turned in a clockwise direction, as seen in FIG. 16, to rest upon shoulder 310, whereupon wheel 40 will be raised a distance equivalent to twice the eccentricity of sleeve 296, as related to sleeve 298. In this position, the relatively delicate sharp edges of the knives will be clear of the damp crop material.

A nut 318 is threaded on shaft 282 beyond hand lever 314 and engages a thrust bearing 320, which refers the rather considerable end thrust developed by engagement of knives 284 which the rotating crop core, to the surface of lever 314 and thus to sleeve 298 and plate 312, a washer 321 being interposed between lever 314 and plate 312 if desired. Axial adjustment of cutter wheel 40 is achieved by adjusting nut 318 and locking it in adjusted position as by a cotter pin 322.

The box-like housing formed by plates 304 and 306 is solidly supported on above-mentioned portion 157 of the frame of the machine, and on an angle iron 324, supported at one end on frame member 144, and at the other end on plate 220.

Plate 302 is solidly fixed to angle iron 324, as by bolts 326, and plate 312 is fixed to flange 196 of portion 157 by bolts 327.

A pulley 328 is fixed on shaft 296 on the opposite side of wheel 40 from collar 300 forming part of drive 295, and serves to receive drive from the power take-off, as will appear. A shield 329 FIG. 2, of suitable sheet material, is supported from the machine frame adjacent wheel 40 and serves to prevent inadvertent contact with the blades 288 by those working around the machine.

The elevator

A shaft 330 (see FIGS. 1, 2, and 8) is suitably journaled on the machine and driven through a pulley 332. At the end remote from pulley 332, it has a sprocket 334 about which a chain 336 is engaged and which has a plurality of lifts or flights 338. Chain 336 travels upwardly on an upwardly inclined elevator floor 340. Crop rolls or pellets 342 gravitate across hopper 42 and into a boot 344 from which they are picked up by flights 338 and transported upwardly over floor 340. At the top of floor 340, chain 336 passes over a sprocket 346, journaled on a shaft 348 supported in a housing 350 carried on the machine, forming an upwardly inclined continuation of boot 344 and supporting therein floor 340. Pellets 342 are discharged at this point to a trailing wagon or other desired place.

This completes the description of the principal components of the machine and their purposes and operation.

Drives

As heretofore indicated, the drive or power for the machine comes from the tractor 20 through a power take-off 27 which drives a shaft 352, best shown in FIG. 20, but see also FIG. 10. Shaft 352 extends entirely through the machine lengthwise and terminates in a sprocket 354, taking the direction of rotation of the power take-off, which is clockwise as seen from the rear, or in FIG. 13. As will be apparent, opposite rotation of shaft 352 could be accommodated by minor rearrangement of gears, chains, etc., which will be understood by those skilled in the art. Sprocket 354 drives a chain 356 extending about a sprocket 358 which it drives in a counterclockwise direction, as seen in FIG. 13; about a tightening idler 360 supported on an adjustable plate 361, about a sprocket 362 and about a sprocket 364. Sprockets 362 and 364 are driven, also in a counterclockwise direction by chain 356.

Sprocket 358 is fixed on a shaft 366 journaled in a suitable bearing arrangement 368 mounted on above-mentioned plate 258, and shaft 366 is connected with and drives above-mentioned universal joint shaft 174. Joint shaft 174, as hereinbefore explained, drives forming roller 50. In similar manner sprocket 362 is mounted on a shaft 369 which is connected with and drives above-mentioned joint shaft 160. Joint shaft 160, as hereinbefore stated, connects with and drives roller 36. In like manner, sprocket 364 is mounted on a shaft 370 which connects with and drives universal joint shaft 166 and in turn roller 52.

In this way, power is imparted to the forming rollers and through them, as heretofore explained, to the finishing rollers.

It will be noted that chain 356, as seen in FIG. 13, forms an irregular loop and that while sprocket 354 and idler 360 are inside the loop, sprockets 358, 362, and 364 are outside the loop and by reason of this relation are driven in the opposite direction from drive sprocket 354. As heretofore explained, charging roller 54 runs in the opposite direction from rollers 36, 50, and 52, for example. In order to drive the charging roller, a sprocket 372 fixed on a shaft 374 is engaged inside of the loop formed by chain 356. It therefore runs in clockwise direction rather than a counterclockwise direction, or opposite to sprockets 358, 362, and 364. Shaft 374 connects with and drives a universal joint shaft 376 which connects with and drives roller 54. It will be noted that shaft 374 is located at a rather low position in the machine which, with the sharp downward pitch of roller 54, results in a favorable angle for joint shaft 376.

A sprocket 378 is fixed on shaft 352 on the opposite side of plate 258 from sprocket 354, and drives through a chain 380, above-mentioned sprocket 264, on spindle 57, as best seen in FIGS. 5, 10, and 20. If for any reason, it should be desirable to run spindle 57 at a speed which differs from that of the hay core 47, this is readily accomplished by substituting different sizes of sprockets 378 and 264.

As heretofore explained, spindle 57 is ordinarily run at the speed at which crop core 47 rotates between the forming rollers, such speed being determined by considering the relative diameters of the forming rollers and the core, but under special conditions, it might be desirable to run spindle 57 faster than this, or under other conditions to run it slower than the normal rotation of the hay core. Either variation is considered as within the scope of the invention.

The remaining units of the machine operate on shafts or axes which are generally transverse to the elements so far described.

The drive to these elements is obtained from above-mentioned shaft 352 which has a bevel gear 382, FIGS. 10 and 20, enclosed in a gear housing 384, carried on the structure of the machine particularly on element 157, and through which shaft 352 extends. Gear 382 drives a bevel gear 386 fixed on a shaft 388, journaled in gear housing 384. Shaft 388 has fixed thereon a pulley 390 which drives, through a belt 392, a pulley 394 fixed on a shaft 396. Shaft 396 extends substantially for the entire width of the machine, to the end of the pickup portion, being carried in bearings 398, 400, and 402, (see also FIGS. 2 and 13) and has a sprocket 404 engaged with a chain 406. Chain 406 engages above-mentioned sprocket 124 and also a sprocket 408 on a shaft 410, forming a part of above-mentioned beater 30. Shaft 396 therefore drives beater 30 and auger 32, the sizes of the sprockets being so chosen as to result in the desired speeds in these units.

Shaft 396 has a sprocket 412 which drives, through a chain 414, a relatively small sprocket 416 fixed on a shaft 418. Shaft 418 is supported in suitable bearings as 420, and also extends through to the extremity of pickup portion 28. It has fixed thereon a sprocket 422 which drives through a chain 424, above-mentioned sprocket 112. Since sprockets 416 and 112 are relatively small compared to their respective driving sprockets, the speed of sprocket 112 and accordingly of auger 34 is very much higher than that of shaft 396.

Shaft 396 also has a sprocket 426 which drives, through a chain 428, a sprocket 430. Sprocket 430 is fixed on a shaft 432 carried in bearings as 434, and extending across the space between member 182 and the inner end of pickup unit 28.

Shaft 432 has a sprocket 436 (see also FIG. 9) which drives a chain 438. Chain 438 is trained around idlers 440 and 442, and maintained thereby in engagement with a sprocket 444 fixed on above-mentioned shaft 60, constituting a part of the pickup cylinder or spider. By virtue of the disposition of sprocket 444 on the outside of the loop formed by chain 438, sprocket 444 is run in the reverse direction from sprocket 436, which direction is correct for the operation of the pickup. Shaft 432 is preferably aligned with pivot 66 so that swinging of arms 64 may take place without interference from or with chain 438.

Shaft 432 has fixed thereto a pulley 446 which drives, through a belt 448, above-mentioned pulley 332 (see also FIG. 2). Pulley 332, as above described, is mounted on shaft 330 and thereby drives sprocket 334 constituting a part of the elevator.

Shaft 330 has also fixed thereon a sprocket 450 which drives a sprocket 452 by means of a chain 454, sprocket 452 being fixed on a shaft 456. Shaft 456 is journaled at the upper end of an arm 458 which is swingable substantially about shaft 330. Shaft 456 also has a pulley 460 fixed thereon and driving, through a belt 462, above-mentioned pulley 328 on cutter wheel shaft 296, thus constituting above-mentioned drive 295.

In the present instance, arm 458 is urged toward the front of the machine, or in a clockwise direction as seen in FIG. 2, by means of a suitable spring arrangement, generally designated as 464.

As hereinbefore stated, the axial movement of the crop core tends to turn cutter wheel 40 at a rate synchronized with the travel of the core. However, under some conditions the core may not travel fast enough, whereupon the drive to wheel 40, just described, may be effective to urge the material in its axial direction, as well as to cut it into short sections. Conversely, if the material tends to travel too fast, wheel 40 may be instrumental in stabilizing the movement and keeping it under control. If large discrepancies occur between the speed of the crop core and wheel 40, so as to set up excessive forces against knives 284 or in other parts, belt 462 may slip to relieve such stresses, belt 462 being preferably a simple flat belt which grips only in proportion to the actual tension imposed thereon by the spring arrangement 464. Further, by the slipping of belt 462, an impositive assisting or retarding force can be exerted against the crop core simultaneously with the cutting action.

*Operation*

The operation of the machine is thought to be clear from the foregoing description, but by way of summary it is pointed out that the previously harvested crop is picked up by pickup fingers 76, fed to auger 32 by means of beater 30 and fed by augers 32 and 34 into the bite between the charging roller 54 and forming roller 52. The crop is then formed into a roll or core, preferably about a spindle or starter 57, and given a strong axial component by the rotation of the specially shaped skewed rollers.

While still rotating, the crop is pressed axially through the space between the finishing rollers 38, 132, and 134 which continue to compact the crop and keep it rotating, while however retarding the axial movement. This is so because the movement between the core and the finishing rollers is not strictly a true rolling motion. Insofar as the rotation of the crop is concerned, it rolls on the surface of the finishing rollers. However, as to the axial motion of the crop, the crop must slide. The sliding introduces frictional resistance into the axial movement until sufficient pressure is built up by the positive expelling of the crop by the forming rollers to overcome the friction. Thus, the degree of friction on the finishing rollers determines to a substantial extent the density or hardness of the crop core. This is readily adjusted by changing the pressure of spring 238.

The action of the finishing rollers in continuing the rotation of the crop core, enhances the action of the cutter wheel 40 since the rotation allows for a drawing or slicing type of cut by the individual knives 284.

Although it is, of course, desirable to keep knives 284 in good condition, it has been found that by virtue of the rapid rotation of the crop core, the maintenance of these knives is not critical and that the cutting is satisfactory even after appreciable deterioration of the sharp edges.

To avoid unnecessary damage from corrosion and the like, since a portion of the crop core normally remains in the machine at the end of a run, knives 284 may be entirely removed from the crop core when the machine is not in use, by the manipulation of lever 314.

The pressure of roller 54 against roller 52 is readily adjusted so as to crush all or part of the incoming crop to liberate certain moisture components including protoplasm which may act as a binder for the finished pellets or rolls, and this pressure is readily adjustable by introducing more or less twist into torsion bar 178. The contact between the curved surfaces of these rollers, by reason of their opposite rotation, results in conflicting force components applied to the crop material passing between the rollers. Thus, roller 52, in accordance with the principle explained in connection with FIG. 3a, tends to propel material toward the front of the machine, while roller 54, by reason of its reverse rotation, tends to propel the same material at the same time toward the rear of the machine. The result is to scrub or abrade the material to an extent which will further tend to liberate the juices in the crop material.

The above constitutes a description of a novel hay pelleter which will accomplish the objects of the invention. It is to be understood, however, that variations of the mechanical details and the functional parts will doubtless occur to those skilled in the art, and it is also to be understood that all such variations are considered as being part of the invention insofar as they are covered by the annexed claims.

Modifications

A modified form of pickup and feeding arrangement is contemplated which utilizes basically a pair of parallel augers instead of coaxial augers as hereinbefore disclosed. Such an arrangement is advantageous in that it reduces the mass of material to a relatively wide and generally flat sheet before the material encounters the crushing rollers. It is shown partly diagrammatically in FIGS. 21 and 22. In these views, a pickup generally designated as 464 has endless chains 466 passing about sprockets as 468 and 470, chains 466 carrying tine bars 472 which carry pickup teeth 474 extending outwardly between strippers 476 to engage crop material lying on the ground. The material is raised by teeth 474 moving generally upwardly and backwardly, sliding the material on strippers 476 and into the region of a beater 478 disposed transversely of strippers 476 and having teeth 480 positioned to engage the crop material, comb it, and assist it backwardly onto a composite platform 482.

Platform 482 acts as a trough for augers 484 and 486 which are arranged to extend in a common direction transverse to the travel of material on pickup 464. Augers 484 and 486 are preferably of the same hand and intermeshed, and the flights 488 and 490 thereof preferably increase in pitch toward the exit end, or toward the right end, as seen in FIG. 22. Augers 484 and 486 are driven synchronously in the same direction by suitable means, as a chain 491 engaged with sprockets 492 and 493 fixed in relation to augers 484 and 486 respectively, chain 491 being actuated from any suitable moving part on the machine.

Composite platform 482 comprises a transversely disposed downwardly open channel member 494 generally beneath auger 486 and extending along the length thereof. Rearwardly thereof is a Z bar 495 disposed parallel to the channel 494, and interposed therebetween is an upwardly directed plate 496 which extends above the generally common surface of platform 482 toward auger 484. Bolts 497 extend through the usual flanges of members 494 and 495, and also through suitable holes in plate 496, plate 496 having extra holes 498, FIG. 23, so that it can be adjusted toward and away from auger 484. Plate 496 extends substantially the length of auger 484 and acts as a stripper or retarder bar to prevent winding of long material on auger 484 and to insure that all material is propelled axially of the auger.

Rearwardly of Z bar 495 is a downwardly open channel 499, and rearwardly of channel 499 is a downwardly open channel 500. Channel 500 adjoins a back wall 502 which has a flange contiguous to the rear flange of channel 500. A stripper plate 504 is interposed between Z bar 495 and channel 499. In similar manner, a stripper plate 506 is interposed between channel 499 and channel 500, and a stripper plate 508 is interposed between channel member 500 and back wall 502. Stripper plates 504, 506, and 508 are supported and adjusted in a manner similar to plate 496, and add to the effect thereof in preventing wrapping of long crop material on auger 484. Also by adjusting plates 496, 504, 506 and 508 individually, it is possible to control the pattern or distribution of the material in the mat being propelled beneath the augers.

A chute or shelf 602 may extend from the end of platform 482 adjacent to the exit end of augers 484 and 486 to a position adjacent the bite between a pair of primary compressing, charging, or crushing rollers 604 and 606.

Before discussing other modifications, it is to be noted that, while there has been disclosed several possible feeding arrangements, other constructions could be employed in combination with the other components of the machine. These could include, for example, a belt or chain conveyor, oscillating or rotary forks or rakes, or a blower. Furthermore, it is contemplated that the disclosed feeders can be used in combination with other machines such for example as balers, forage harvesters, and other devices adapted to deal with fibrous material.

Referring again to the modified charging roller assembly, it is seen in FIG. 22 that rollers 604 and 606 are arranged one above the other and axially transverse to augers 484 and 486. Rollers 604 and 606 are preferably identical and in the form of the frustum of a cone, and therefore will work together on a line contact in true rolling relation. Rollers 604 and 606 are so positioned that the line of contact or bite is substantially parallel to and a little above platform 482 and shelf 602, preferably such a distance that the mat of material flowing toward the bite will be pressed against both rollers 604 and 606, partly above and partly below said bite. In this way the material, already in the shape of a generally flat mat, is fed into a bite which is generally commensurate with the width of the mat. The material is then further flattened and rolled into a relatively thin ribbon, peculiarly well adapted to be rolled into a rod-like core. It is usually desirable for best operation to have the mat of material as even as possible in thickness as it approaches rollers 604 and 606, whereas auger conveyors of the general type shown have a tendency to propel the material in a more or less concentrated mass toward the rear of the auger trough. Plates 496, 504, 506 and 508, as well as preventing winding of material about the augers, prevent material stripped from auger 486 by auger 484 from being carried too readily beneath auger 484, so that the operation is divided satisfactorily between augers 486 and 484 and a relatively even mat is presented to rollers 604 and 606. It is contemplated that, if for any reason it should be desirable to have the mat otherwise then even, a satisfactory distribution of the material beneath the augers can be obtained by adjusting plates 496, 504, 506, and 508.

Rollers 604 and 606 are pressed toward each other by means of springs, as spring 608 which presses downwardly against a bearing 610 engaged with a shaft 612 constituting the axle or gudgeon for roller 604. It is contemplated that the pressure of spring 608 will be such as to cause a desired amount of crushing of the stems or other parts of the crop material passing between rollers 604 and 606. A bearing 614 supports a shaft or gudgeon 616 forming the axle for roller 606, and is in turn supported on any convenient portion of the machine.

Material emerging from rollers 604 and 606 passes immediately beneath a roller 618 which corresponds with hereinbefore mentioned charging roller 54 and is fed between it and a roller 620 corresponding to hereinbefore described roller 52. Augers 484 and 486, as well as pickup 646 and rollers 604 and 606 are driven in a manner not shown, but analogous to corresponding parts in the hereinbefore described embodiment.

It is contemplated that rollers 604 and 606 may be omitted within the scope of the invention, and the material fed directly to rollers 618 and 620, the inclination of floor 482 corresponding generally to that of the bite between rollers 618 and 620. The position of floor 482 may be so chosen as to insure this relation.

The rollers 604 and 606 could be used to direct the stream of material to the forming chamber without the use of the charging roller 618. The charging rollers 604 and 606 can take other configuration, such as for example, mating hyperboloids, cones, cylinders, or the like. While the charging roller 618 is illustrated as half a hyperboloid, other shapes may be substituted therefor such as a cylindrical roller, or a portion of a cone. Any shape of charging roller that can be mated to a reasonable length of the straight line element of the forming roller may be substituted for the half hyperboloid shown.

Also it is within the scope of this invention to feed the material directly into the forming chamber without the use of the charging roller arrangement illustrated in the drawings.

It is possible that conditions might be found wherein the crop material would wrap so tightly around spindle 57 as to interfere with the desired stripping action of rollers 36, 50, and 52. To overcome this condition and insure dependable stripping of the core from the spindle at all times, a spindle arrangement is contemplated in which the spindle has an irregular cross section and is driven in a non-uniform manner so that the spindle will be rotated slightly in relation to the uniformly rotating crop core, first in one direction, and then in the other so as to tend to enlarge the space within the core and tend to loosen the spindle therein. The crop core will then avoid adhering to the spindle so tightly that it will interfere with removal by the forming rollers. The manner in which this is accomplished is shown in FIGS. 24, 25, and 26.

Frame members 622 and 624, support a plate 626 corresponding to above-mentioned plate 258, FIG. 10, and a power shaft 628 extends through a gear box 630 carried on member 622. Shaft 628 is supported in a bearing 632 carried on plate 626, and has a sprocket 634 which drives a chain 636 arranged preferably identically with and for the same purpose as above-mentioned chain 356. In other words, chain 636 drives the forming and finishing rollers as in FIGS. 10, 12, and 13, and no additional disclosure thereof is necessary. Shaft 628 also has a sprocket 638 which supports and drives a chain 640 disposed outwardly, or rearwardly of chain 636. Chain 640 drives a sprocket 642 fixed on an input shaft 644 journaled in a gear box supported on plate 626 and generally designated as 646. Input shaft 644 is located in a position corresponding substantially with but slightly offset from that of spindle 57 in FIG. 13.

Gear box 646 comprises a bearing bracket portion 648 on the rear side of plate 626 and a housing portion 650 on the front side of plate 626 opposite bracket portion 648, the two being clamped in place by bolts 652 extending through plate 626. Mechanism within gear box 646 rotates, in a non-uniform manner, a spindle 654, which in the present instance is given a square cross section at 656 and disposed within a cluster of rollers (not shown) as in the case of spindle 57 in FIG. 5.

Shaft 644 extends through a suitable bearing 658 forming part of bracket 648, and has fixed therewith within housing portion 650 an internal gear 660. Gear 660 meshes with and drives a gear 662 fixed on spindle 654, which in turn is supported in a bearing 664 on housing 650 and in a bearing 666 supported on the machine in a manner corresponding to above-mentioned bearing 254. Bearing 664 is adapted to withstand whatever end thrust is developed in spindle 654 by the action of the crop core.

Gears 660 and 662, as more particularly shown in FIG. 25, have specially shaped teeth which, unlike usual gear teeth have flat or plane faces where they run together. This is opposed to the usual arrangement wherein the teeth are accurately curved to give as smooth and uniform a drive as possible to the driven gear. A tooth 668 will first contact a tooth 670 at its outer end, driving gear 662 through radius R. An instant later, tooth 668 will contact tooth 670 face-to-face and start driving tooth 670 by contact of the inner end of tooth 668 with the face of tooth 670. Gear 660 will then be acting on gear 662 at the shorter radius $R_1$, and, assuming uniform rotation of gear 660, will cause a momentary increase in the speed thereof, until it has passed a predetermined distance whereupon it becomes ineffective and the next tooth in gear 660 contacts gear 662. Sufficient lost motion or backlash is provided to insure against any binding of the gears, and the result is a rapid cyclic variation in the rotation of spindle 654 which will tend to prevent excessively tight winding of the crop material on spindle 654. The action, as related to the crop core is one of rapid torsional oscillation.

A modified type of spindle which is particularly adaptable to controlling a crop core in its forming stage is disclosed in FIG. 27. While the crop core ordinarily rotates and moves axially out of the forming chamber with a powerful force, it is possible that there might be conditions where this would not be so. Furthermore, there is the chance that the core might be expelled too rapidly to be compacted to the desired density under certain conditions, for example when the crop is light. By controlling the rate of rotation of the spindle in the manner hereinbefore described, the modified spindle may be made to control the formation of the core.

The modified spindle generally designated as 671 comprises a shaft portion 672 carried in a bearing 674 supported in a plate 676, portion 672 being also supported by other bearing means and driven, preferably in a manner similar to above-mentioned spindle 57 as seen in FIGS. 5, 10 and 20. It is contemplated that a drive similar to that disclosed in FIGS. 24, 25 and 26 may be used in connection with spindle 671 if desired. Spindle 671 is extended into a core forming chamber 678 formed as hereinbefore described between a cluster of forming rollers 680, 682 and 684 which are supported and driven in a manner similar to that fully disclosed in FIGS. 10 and 12. Rollers 680, 682 and 684 adjoin finishing rollers 686, 688 and 690, respectively, which correspond with finishing rollers 38, 132, and 134, as disclosed in FIGS. 3, 4, and 5, the space between rollers 686, 688 and 690 forming a continuation of core forming space 678. Shaft 672 has flighting 692 thereon which is oriented to propel a core 694 wrapped around spindle 671 toward the right or exit end of core chamber 678 when spindle 671 is rotated in the direction of rotation of the core. When spindle 671 is rotated at the same speed as core 694, it is apparent that there will be no relative movement between spindle 671 and core 694, and that flighting 692 will constitute an impediment to the stripping of the core from the spindle. On the other hand, spindle 671 might be rotated at a speed in excess of the speed of core 694, in which case flighting 692 would tend to propel the core along the spindle and assist in getting the core to move out of chamber 678. The speed of rotation of spindle 671 is chosen as aforesaid, to obtain the desired effect on core 694.

Thus, if the core tends to be sluggish in its movement out of chamber 678, spindle 671 will be run enough faster than core 678 to tend to propel the core in the desired direction. On the other hand, if the core tends to move out of chamber 678 more rapidly than would be desired, and which might result, for example, in the core's being too soft, a slower speed is chosen for spindle 671 so that the flighting 692 will hold back the core, and permit its advance toward the outlet at a rate which is less than that induced by the skewing of rollers 680, 682 and 684, as hereinbefore explained. In this way, the density of the core 694 may be controlled by controlling the rate of rotation of spindle 671 in relation to that of core 694.

Flighting 692 preferably extends from the point on spindle 671 where rollers 680, 682 and 684 begin to recede from shaft 672 of the spindle, part way toward the exit end of chamber 678, and preferably the pitch of the flighting, or the distance between successive turns increases in the direction of movement of the core.

At a point 696 flighting 692 is discontinued and a groove 698 is formed which is spiralled about spindle 671 in a manner similar to flighting 692, and which continues to the end of spindle 671. The pitch of spiral groove 698 increases in the direction of movement of core 678, and the spindle may continue through the length of chamber 678 and into the space between the finishing rollers 686, 688, and 690. It is contemplated that groove 698 will be less aggressive than flighting 692, and that this will be of advantage at this point on the spindle where the core is nearly completely formed, and the propelling effect of rollers 680, 682, and 684 is therefore quite definite. A spindle is therefore provided which can have a powerful effect on the formation of a crop core.

Other variations in the spindle are within the scope of the present invention. For example, any polygonal cross section is considered possible, or the spindle may be fluted, chisel shaped, or take other configurations.

The machine hereinbefore described is characterized by a method of treating crop material to form pellets, which is novel and which is different from heretofore known methods in that the material is formed into a core by a rolling motion and wrapping action while being compacted with comparatively gentle pressure, the fibers being first combed and arranged generally parallel to each other. Furthermore, it is preferred that care be taken to avoid rotating any part of the core more than any other, so that the core is not twisted, and the intertwining and interwinding fibers are not subjected to a breaking stress, and retain their original length. They therefore, in their interwound condition, lend their strength to prevent expanding or swelling of the core either in the forming process or later.

Another feature of the method is the winding of the mat of crop material on a spindle prior to or simultaneously with the rolling. This action leaves a void or channel within the core beyond the spindle, which, even though the core may expand inwardly into such channel, will result in the pellets' having a relatively soft center, and it is contemplated that this process may be carried far enough to provide a substantially clear opening through the core and resulting pellets, which will be useful in facilitating drying thereof.

The manner of rolling the core is novel in that the contact of the core with the rolling means, in the preferred embodiment using hyperbolic rollers, is a true rolling action throughout the length of the core, and the core is rolled, not only in a circumferential direction, but also in an axial direction, and the novel relation of the diameters of the core and forming roller is responsible for avoiding the aforesaid undesirable twisting of the core. The rolling is such that the core is given a substantially uniform angular velocity or rotation throughout its length.

The method just described is performed by the embodiments of the machine illustrated and described in detail. However, other variations could be provided on the disclosed structure, and which would also be effective. For example, the forming rollers shown might take other shapes, such as truncated cones in place of the half hyperboloid form shown, and other shapes of approximately this configuration might be substituted within the scope of the invention. Furthermore, the forming chamber could be formed by 4, 5, or more forming rollers, substantially all of which could be shaped in the manner hereinbefore referred to. Furthrmore, the forming rollers might be mounted for slight yielding movement if desired.

Variations in the shape of the finishing rollers are also contemplated; for example, the finishing rollers might be tapered instead of cylindrical, or hyperboloids, or parts of hyperboloids might be used, or the surfaces of the finishing rollers might be knurled if desired.

Although the cutting means is disclosed as located so as to operate between the finishing rollers, it is within the scope of the invention to position it beyond the finishing rollers. It is also within the scope of the invention to omit the finishing rollers and locate the cutting means beyond the forming rollers.

While particular device mechanisms have been illustrated and described, it is to be understood that other drive mechanisms could be used for the various departments of the machine, such as hypoid gear arrangements, twisted V-belts, or other mechanical devices. Electrical or fluid pressure mechanisms also might be used, and the speed of the rollers or other components might be automatically regulated if desired.

Variations in the combinations, components, and mechanical details of the hereinbefore described embodiments may be devised by those acquainted with this art, and it is to be understood that all such variations as are fairly covered by the claims are to be considered part of the invention.

What is claimed as new and desired to be secured by Letters Patent of the United States:

1. In a compacting device for feeding crops including means for feeding crop material, a plurality of forming rollers having axes arranged in a skewed relationship to cross each other in spaced relation and provide a core forming chamber therebetween, means for rotating said rollers in the direction to impart to a core in said chamber a rolling motion having a component moving out of said chamber, roller means for restricting the movement of said core of crop material out of said chamber, and means for cutting the core of crop material into a series of pellets.

2. In a compacting device for food crops the combination of means for feeding crop material, a spindle rotatably supported in the path of material coming from the feeding means, means for rotating said spindle, a plurality of forming rollers having axes arranged in skewed relationship about said spindle to cross each other in spaced relation and provide a core forming chamber between said rollers having an open exit end, means for rotating said rollers in a common direction such as to develop a motion component on said core in the direction of said exit end, roller means for restricting the movement of a core of crop material out of said core forming chamber, and means for cutting the core of the crop material into a series of bodies of desired size.

3. In a compacting device for food crops the combination of means for feeding crop material, a spindle rotatably supported in the path of material coming from the feeding means, means for rotating the spindle, a plurality of forming rollers having axes arranged in skewed relationship about said spindle to provide a core forming chamber between said rollers having an open exit end, means for rotating said rollers in a common direction such as to develop a motion component on said core in the direction of said exit end, a charging roller in position to receive crop material from the feeding means and to impel it into said core forming chamber, means for rotating said charging roller, means for restricting the movement of a core of crop material out of said core forming chamber, and means for cutting the core of crop material into a series of bodies of desired size.

4. In a compressor for food crops the combination of a plurality of rollers, each generally in the shape of one-half of a hyperboloid, said rollers being arranged in a cluster, such that the large ends thereof are disposed in a common direction and the surfaces of the rollers define between them a core forming chamber, two of the rollers being spaced apart circumferentially to provide a charging opening leading to said chamber from one side thereof, means for rotating the rollers in a common direction for rolling a body of crop material into a core between the rollers, and the rollers being supported so that the axes thereof recede from the region of the core forming chamber in the direction of said large ends and are skewed in relation to said chamber so that the distal ends of said axes are circumferentially displaced relatively to the proximal ends thereof about said core forming chamber in the direction of rotation of said rollers.

5. In a compressor for food crops the combination of a plurality of rollers, each generally in the shape of part of a hyperboloid, said rollers being arranged in a cluster, such that the surfaces of said rollers define between them a core forming chamber, means for rotating the rollers in a common direction for imparting rolling movement to a body of crop material being formed into a core between the rollers, a power input shaft, means connected with said means for rotating the rollers and with said power input shaft for rotating said rollers by reason of rotation of said power input shaft, and the rollers being arranged so that the axes thereof are skewed in relation to said chamber so that the exit end of each of said axes is circumferentially displaced about said core forming chamber relatively to the other end thereof in the direction of rotation of said rollers.

6. In a compressor for food crops the combination of a plurality of rollers, each generally in the shape of one-half of a hyperboloid, said rollers being arranged in a cluster, such that the large ends thereof are disposed in a common direction and the surfaces of the rollers define between them a core forming chamber, two of the rollers being spaced apart to provide a charging opening, means for rotating the rollers in a common direction for rolling a body of crop material between the rollers, and the rollers being arranged so that the axes thereof recede from the region of the core forming chamber in the direction of said large ends and are skewed in relation to said chamber so that the distal ends of said axes are circumferentially displaced relatively to the proximal ends thereof about said core forming chamber in the direction of rotation of said rollers, a spindle rotatably supported generally axially in said core forming chamber, axially fixed therein, means connected with said spindle for controlling the rotation thereof, and means for restricting the movement of a core of crop material out of said core forming chamber.

7. In a food crop compressor a cluster of forming rollers disposed about and defining between them a core forming chamber, means for rotating said rollers in a common direction said rollers being so spaced as to provide a charging opening, a platform positioned to receive thereon crop material to be compressed, a first auger rotatably supported above said platform and comprising a substantially cylindrical body portion substantially coextensive with the width of said platform and extending toward said charging opening, flighting on said body portion having a pitch which becomes larger as it approaches said charging opening, a second auger coaxial with the first auger and comprising a conical body portion having a large end sugstantially continuous with said cylindrical body portion, and a small end adjacent said charging opening, flighting on said conical body portion having a pitch which becomes larger as it approaches said small end, said platform having a portion extending upwardly to partially enclose said first auger, a shroud enclosing the flighting on said second auger and having an exit opening adjacent the small end thereof, means for rotating said first auger in a direction to impel material toward said second auger, means for rotating said second auger at a speed greater than that of said first auger, in a direction to continue the impelling of material in the direction initiated by said first auger and at a speed greater than that of said first auger, a trough positioned to receive material from said second auger and guide it into said charging opening, and means communicating with said core forming chamber for restricting the progress of a core of crop material out of said chamber.

8. In a compressor for food crops the combination of a plurality of rollers, said rollers being arranged in a cluster such that they define between them a core forming chamber, having an outlet end, means for rotating the rollers in a common direction for rolling a body of crop material between them, and the rollers being arranged so that the axes thereof are skewed in relation to said chamber whereby the ends of said axes adjacent said outlet end of said core forming chamber are circumferentially displaced relatively to the ends thereof adjacent to the other end of said chamber in the direction of rotation of said rollers, a spindle rotatably supported generally axially in said core forming chamber, which spindle is axially fixed in said core forming chamber and is continuously exposed to the crop material located therein throughout a major portion of its length, and means connected with said spindle for causing rotation thereof, at a rate substantially equivalent to that of a crop core emerging from said core forming chamber.

9. In a compacting device for food crops the combination of a plurality of rollers, each generally in the shape of a body of revolution about an axis, said rollers being arranged in a cluster forming between them a core forming chamber, the axes of the rollers being angled so that the ends thereof adjacent one end of the chamber are circumferentially displaced relative to the other ends of the axes, to propel the material through said chamber, means for rotating said rollers in a common direction for rolling a body of crop material introduced into said core forming chamber into a dense rotating core, and a spindle, means supporting said spindle in a position extending axially into said core forming chamber for rotation, which spindle is continuously exposed to the crop material therein throughout a major portion of its length, means for rotating said spindle simultaneously with said rollers at a rate proportional to that of the rotation of said rollers, and said spindle having a roughened surface for gripping crop material being compacted in said core forming chamber.

10. In a compacting device for food crops the combination with means for supplying crop material, a plurality of forming rollers arranged in position to provide a core forming chamber between said rollers having an exit end, means for rotating the rollers, the axes of said rollers being skewed in relation to said core forming chamber so that, at said exit end of said chamber, the rollers are circumferentially displaced about said core forming chamber in the direction of rotation of said rollers, of means for restricting the movement of a core of crop material out of said core forming chamber comprising a plurality of rollers positioned in relation to said forming rollers to provide between them a continuation of said core forming chamber, the last mentioned rollers being disposed with their axes substantially parallel, means for rotating said last mentioned rollers at a surface speed substantially equivalent to that of a core emerging from said forming chamber, means for yieldingly urging one of said last mentioned rollers toward the others, and means for cutting the core of crop material into a series of bodies of desired size.

11. A material compressor comprising a pair of spaced end supports, a cluster of flared rollers each having a cross section increasing from a minimum diameter at one end so as to have a large and a small end, said rollers extending between and being supported by said end supports and arranged with their large ends adjacent one of said end supports, said rollers being positioned so that their axes lie substantially as close together as possible, so as to have distal and proximal ends and so that said rollers define between them a chamber in which crop material may be rolled into a dense rotating core, and said rollers being also positioned by said end supports so that said distal ends of their axes are circumferentially displaced from each other about said chamber, relatively to said proximal ends thereof, means for rotating said rollers in the direction in which said distal ends are displaced, a substantially cylindrical finishing roller contiguous to each of said flared rollers, said finishing rollers having their axes substantially parallel to the chamber defined between said flared rollers and forming between them a continuation of said chamber, for continuing the rolling of a core formed between said flared rollers, and means for rotating said finishing rollers in the direction and at a rate to continue the rotation of said core substantially at the rate established by said flared rollers.

12. A pelleting machine comprising a pair of spaced end supports, a cluster of flared rollers each having a cross section increasing from a minimum diameter at one end so as to have a large and a small end, said rollers extending between and being supported by said end supports and arranged with their large ends adjacent one of said end supports, said rollers being positioned so that their axes lie substantially as close together as possible, so as to have distal and proximal ends and so that said rollers define between them a chamber in which crop material may be rolled into a dense rotating core, and said rollers being also positioned by said end supports so that said distal ends of their axes are circumferentially displaced from each other about said chamber, relatively to said proximal ends thereof, means for rotating said rollers in the direction in which said distal ends are displaced, a substantially cylindrical finishing roller contiguous to each of said flared rollers, said finishing rollers having their axes substantially parallel to the chamber defined between said flared rollers and forming between them a continuation of said chamber, for continuing the rolling of a core formed between said flared rollers, means for rotating said finishing rollers in the direction and at a rate to continue the rotation of said core substantially at the rate established by said flared rollers, two of said finishing rollers being spaced apart circumferentially of said chamber, a cutting device supported adjacent said finishing rollers, and a series of cutting elements carried on said cutting device and extending into the space between said spaced finishing rollers in position to contact a core being finished therebetween and to cut said core into desired lengths to form pellets.

13. In a crop material compressor of the type including a compressing unit comprising a cluster of forming rollers defining between them a core forming chamber, means for rotating said rollers in a common direction, said rollers being flared, skewed in relation to each other, and spaced apart so as to provide a charging opening, the combination with said compressor of a pair of substantially parallel adjoining interacting augers positioned to extend toward and to cooperate to feed crop material toward and into said charging opening, a trough construction at least partially enclosing and spaced from said augers, and a stripper plate extending lengthwise of said trough construction and projecting therefrom across the space and into the vicinity of one of said augers.

14. In a compressor for forage crops the combination of means for forming the forage into a mat of interlaced fibers extending in a direction generally lengthwise of said mat, a spindle arranged transversely of said mat, means for rotating the spindle for winding the mat on the spindle, a plurality of rollers arranged in a cluster about said spindle to define a chamber substantially surrounding said spindle, two of said rollers being spaced apart to provide a feed opening for the entrance of said mat into the space between the rollers, means for rotating said rollers in a direction opposite to that of said spindle, said rollers being flared, and arranged with their larger ends adjacent the free end of the spindle, and said rollers having their axes circumferentially displaced about said chamber at the large ends of said rollers, in relation to the small ends thereof, in the direction of rotation of said rollers, whereby the rotation of said rollers will exert a strong axial force on the forage material winding on said spindle to strip said material therefrom and expel it axially of said chamber.

15. In a pelleting device for food crops the combination of means for feeding crop material, a spindle rotatably supported in the path of material coming from the feeding means, means for rotating the spindle, a plurality of forming rollers arranged about said spindle in position to provide a core forming chamber about said spindle and between said rollers, means for rotating said rollers in a common direction, a charging roller in substantially tangential contact with one of said forming rollers and yieldingly urged toward said forming roller, means for rotating said charging roller in a direction opposite to that of said forming rollers, the axes of said forming rollers being skewed in relation to said core forming chamber so that, at one end thereof, said forming rollers are circumferentially displaced about said core forming chamber in the direction of rotation of said forming rollers, means for restricting the movement of a core of crop material out of said core forming chamber, and means associated with the restricting means for cutting the core of crop material into a series of bodies of desired size.

16. In a compacting device for food crops the combination of a plurality of forming rollers, each generally in the shape of a body of revolution about an axis, said rollers being formed of increasing size in the direction of said axes and arranged in a cluster with their large ends disposed generally in a common direction and their surfaces substantially in contact with each other, said rollers receding from each other in said direction and forming between their adjoining surfaces a core forming chamber, two of said rollers being spaced apart more than the others to provide a charging opening transverse to said core forming chamber, means for rotating said rollers in a common direction for rolling a body of crop material, introduced through said charging opening, into a dense rotating core, a feeding roller positioned adjacent said charging opening, means for rotating said feeding roller, said feeding roller being supported in position to direct crop material into said charging opening, means for introducing crop material to said feeding roller, the axes of said forming rollers being skewed in relation to said core forming chamber so that the large ends of said forming rollers are circumferentially displaced relatively to the small ends thereof about said core forming chamber in the direction of rotation of said forming rollers.

17. In a compacting device for food crops the combination of a plurality of forming rollers, each generally in the shape of a body of revolution about an axis, said rollers being formed of increasing size in the direction of said axes and arranged in a cluster with their large ends disposed generally in a common direction and their surfaces substantially in contact with each other, the axes of said rollers receding from each other in said direction and said rollers forming between their adjoining surfaces a core forming chamber, two of said rollers being spaced apart more than the others to provide a charging opening transverse to said core forming chamber, means for rotating said rollers in a common direction for rolling a body of crop material, introduced through said charging opening, into a dense rotating core, the surface of one of said rollers adjacent said charging opening moving in a direction toward said core forming chamber while the surface of the other roller adjacent said charging opening moves in a direction outwardly and away from said core forming chamber, a feeding roller complementary to and substantially in contact throughout its length with said one of said rollers adjacent said charging opening and positioned with clearance from said other roller adjacent said charging opening, means for rotating said feeding roller in a direction opposite to that of said plurality of rollers, the bite between said feeding rollers and said one roller being directed generally toward said charging opening, a guide in said charging opening supported in position to intercept crop material propelled through said bite and direct it away from said outwardly moving surface and into said charging opening and core forming chamber, and the axes of said forming rollers being skewed in relation to said core forming chamber so that the large ends of said rollers are circumferentially displaced about said core forming chamber in the direction of rotation of said forming rollers.

18. In a compacting device for food crops the combination of a plurality of forming rollers, each generally in the shape of a body of revolution about an axis, said rollers being formed of increasing size in the direction of said axes and arranged in a cluster with their large ends disposed generally in a common direction and their surfaces substantially in contact with each other, said rollers receding from each other in said direction and forming between their adjoining surfaces a core forming chamber, a first and a second of said rollers being spaced apart more than the others to provide a charging opening transverse to said core forming chamber, means for rotating said rollers in a common direction for rolling a body of crop material, introduced through said charging opening, into a dense rotating core, the surface of said first roller adjacent said charging opening moving in a direction toward said core forming chamber while the surface of said second roller adjacent said charging opening moves in a direction away from said core forming chamber, a feeding roller complementary to and substantially in contact throughout its length with said first roller and positioned with clearance from said second roller, means for rotating said feeding roller in a direction opposite to that of said plurality of rollers, the bite between said feeding roller and said first roller being directed toward said charging opening, a guide in said charging opening supported in position to intercept crop material propelled through said bite and direct it into said charging opening and into said core forming chamber, said guide having a sharp edge extending lengthwise of, and in scraping relation to the surface of said feeding roller, means for introducing crop material into said bite, the axes of said rollers being skewed in relation to said core forming chamber so that the large ends of said rollers are circumferentially displaced relatively to the small ends thereof about said core forming chamber in the direction of rotation of said forming rollers.

19. In a compacting device for food crops the combination of a plurality of forming rollers, each generally in the shape of a body of revolution about an axis, said rollers being formed of increasing size in the direction of said axes and arranged in a cluster with their large ends disposed generally in a common direction and their surfaces substantially in contact with each other, said rollers receding from each other in said direction and forming between their adjoining surfaces a core forming chamber, a first and a second of said rollers being spaced apart more than the others to provide a charging opening transverse to said core forming chamber, means for rotating said rollers in a common direction for rolling a body of crop material, introduced through said charging opening, into a dense rotating core, the surface of said first roller adjacent said charging opening moving in a direction toward said core forming chamber while the surface of said second roller adjacent said charging opening moves in a direction away from said core forming chamber, a feeding roller complementary to and substantially in contact throughout its length with said first roller and positioned with clearance from said second roller, means for rotating said feeding roller in a direction opposite to that of said plurality of rollers, the bite between said feeding roller and said first roller being directed toward said charging opening, a stationary guide in said charging opening supported in position to intercept crop material propelled through said bite and direct it into said charging opening and into said core forming chamber, means for introducing crop material into said bite, the axes of said rollers being skewed in relation t osaid core forming chamber so that the large ends of said rollers are circumferentially displaced relatively to the small ends thereof about said core forming chamber in the direction of rotation of said forming rollers, a plurality of finishing rollers extended generally in the direction of said core forming chamber and forming between themselves a continuation of said core forming chamber, and means for rotating said finishing rollers in a direction to continue the rotation of a core emerging from said core forming chamber.

20. In a compacting device for food crops the combination of a plurality of rollers, each generally in the shape of a body of revolution about an axis, said rollers being formed of increasing size in the direction of said axes and arranged in a cluster with their large ends disposed generally in a common direction and their surfaces substantially in contact with each other, said rollers receding from each other in said direction and forming between their adjacent surfaces a core forming chamber, means for rotating said rollers in a common direction for rolling a body of crop material, introduced into said core forming chamber, into a dense rotating core, the axes of said rollers being skewed in relation to said core forming chamber so that the large ends of said rollers are circumferentially displaced about said core forming chamber relatively to the small ends of said rollers in the direction of rotation of said rollers, and a plurality of finishing rollers extending generally in the direction of said core forming chamber, said finishing rollers forming therebetween a continuation of said core forming chamber, and means for rotating said finishing rollers in a direction to continue the rotation of a core emerging from said core forming chamber.

21. In a compacting device for food crops the combination of a plurality of rollers, each generally in the shape of a body of revolution about an axis, said rollers being formed of axially increasing size arranged in a cluster with their large ends disposed generally in a common direction and their surfaces substantially in contact with each other, said rollers diverging from each other in said direction and forming between their adjoining surfaces a core forming chamber of increasing cross section toward the large ends of said rollers, two of said rollers being spaced apart more than the others to provide a charging opening leading into said core forming chamber, means for rotating said rollers in a common direction for rolling a body of crop material, introduced through said charging opening, into a dense rotating core, means for introducing crop material into said charging opening, the axes of said rollers being skewed in relation to said core forming chamber so that the large ends of said rollers are circumferentially displaced about said core forming chamber relatively to the small ends of said rollers in the direction of rotation of said rollers, a plurality of finishing rollers extending generally in the direction of said core forming chamber and forming therebetween a continuation of said core forming chamber, and means for rotating said finishing rollers in a direction to continue the rotation of a core emerging from said core forming chamber and passing into said continuation of said core forming chamber.

22. In a compacting device for food crops the combination of a plurality of rollers, each generally in the shape of a body of revolution about an axis, said rollers being formed of increasing size in the direction of said axes and arranged in a cluster with their large ends disposed generally in a common direction and their surfaces substantially in contact with each other, said rollers receding from each other in said direction and forming between their adjacent surfaces a core forming chamber, two of said rollers being spaced apart more than the others to provide a charging opening leading into said core forming chamber, means for rotating said rollers in a common direction for rolling a body of crop material, introduced through said charging opening, into a dense rotating core, means for introducing crop material into said charging opening, the axes of said rollers being skewed in relation to said core forming chamber so that the large ends of said rollers are circumferentially displaced about said core forming chamber relatively to the small ends of said rollers in the direction of rotation of said rollers, a plurality of finishing rollers extending generally in the direction of said core forming chamber and forming therebetween a continuation thereof, two of said finishing rollers being spaced apart more than the others, cutting means in the resulting space between said finishing rollers in position to engage a core being rolled between said finishing rollers, for severing said core into a series of bodies of desired size, and means for rotating said finishing rollers in a direction to continue the rotation of a core emerging from said core forming chamber while being severed by said cutting means.

23. In a compressor for food crops the combination of a plurality of rollers, each generally in the shape of one-half of a hyperboloid, means for supporting said rollers in a cluster, such that the surfaces thereof define between them a core forming chamber, two of the rollers being spaced apart circumferentially to provide a charging opening leading into said chamber from one side thereof, means for rotating the rollers in a common direction for rolling a body of crop material between the rollers, and the rollers being arranged so that the axes thereof recede from the region of the core forming chamber and are skewed in relation to said chamber so that the distal ends of said axes are circumferentially displaced relatively to the proximal ends thereof about said core forming chamber in the direction of rotation of said rollers.

24. In a compressor for food crops the combination of a plurality of rollers, each generally in the shape of part of a hyperboloid having a small end and increasing in diameter axially from said small end, means for supporting said rollers in a cluster, such that the surfaces thereof define between them a core forming chamber, means for rotating the rollers in a common direction for rolling a body of crop material between the rollers, and the rollers being arranged so that the axes thereof recede from the region of the core forming chamber in the direction of the large ends of the rollers so that at one end the axes thereof are proximal and at the other end the axes are distal, and said axes being skewed in relation to said chamber so that the distal ends of said axes are circumferentially displaced relatively to the proximal ends thereof about said core forming chamber in the direction of rotation of said rollers.

25. In a compressor for food crops the combination of a plurality of rollers, said rollers being arranged in a cluster, such that they define between them a core forming chamber, means for rotating the rollers in a common direction for rolling a body of crop material between them, and the rollers being arranged so that the axes thereof are skewed in relation to said chamber whereby the ends of said axes adjacent one end of said core forming chamber are circumferentially displaced relatively to the ends thereof adjacent to the other end of said chamber in the direction of rotation of said rollers, a spindle rotatably supported generally axially in said core forming chamber and axially fixed therein, and means connected with said spindle for causing rotation thereof, at a cyclically varying rate substantially equivalent to that of a crop core emerging from said core forming chamber.

26. In a compacting device for food crops the combination of a plurality of rollers, each generally in the shape of a body of revolution about an axis, said rollers being arranged in a cluster and forming between them a core forming chamber, means for rotating said rollers in a common direction for rolling a body of crop material introduced into said core forming chamber into a dense rotating core, and a spindle, means supporting said spindle in a position extending axially into said core forming chamber for rotation therein, means for rotating said spindle at a rate proportional to that of the rotation of said rollers, but varying continuously between a speed in excess of said rate and a speed which is less than that of said rate.

27. In a compacting device for food crops the combination of a plurality of rollers, each generally in the shape of a body of revolution about an axis, said rollers being arranged in a cluster and forming between them a core forming chamber, means for rotating said rollers in a common direction for rolling a body of crop material introduced into said core forming chamber into a dense rotating core, and a spindle, means supporting said spindle in a position extending axially into said core forming chamber for rotation therein, a helical rib fixed on the surface of said spindle, means for rotating said spindle at a rate proportional to that of the rotation of said rollers, faster than that of said core, said means for rotating said spindle having another adjustment in which said spindle is rotated at the same speed as said core, and still another adjustment in which said spindle is rotated at a speed which is slower than that of said core.

28. In a pelleting device for food crops the combination of means for feeding crop material, a plurality of forming rollers arranged in position to provide a core forming chamber between said rollers, means for rotating said rollers in a common direction, a charging roller in substantially tangential contact with one of said rollers and yieldingly urged toward said forming roller, means for rotating said charging roller in a direction opposite to that of said forming rollers, the axes of said forming rollers being skewed in relation to said core forming chamber so that at one end thereof, said forming rollers are circumferentially displaced about said core forming chamber in the direction of rotation of said forming rollers, means for restricting the movement of a core of crop material out of said core forming chamber, and means associated with the restricting means for cutting the core of crop material into a series of bodies of desired size.

29. In a compressor for food crops the combination of a plurality of rollers, each generally in the shape of one-half of a hyperboloid, said rollers being arranged in a cluster, such that the large ends thereof are disposed in a common direction and the surfaces of the rollers define between them a core forming chamber, two of the rollers being spaced apart to provide a charging opening, means for rotating the rollers in a common direction for rolling a body of crop material between the rollers, and the rollers being arranged so that the axes thereof recede from the region of the core forming chamber in the direction of said large ends and are skewed in relation to said chamber so that the distal ends of said axes are circumferentially displaced relatively to the proximal ends thereof about said core forming chamber in the direction of rotation of said rollers, and means for restricting the movement of a core of crop material out of said core forming chamber.

30. In a compressor for food crops the combination of a plurality of rollers, each generally in the shape of part of a hyperboloid, said rollers being arranged in a cluster, such that the surfaces of said rollers define between them a core forming chamber, means for rotating the rollers in a common direction for imparting rolling movement to a body of crop material being formed into a core between the rollers, said means comprising a power input element and a shaft connected with said power input element and with one of said rollers for driving the latter by reason of rotation of said power input element and the rollers being arranged so that the axes thereof are skewed in relation to said chamber so that the exit end of each of said axes is circumferentially displaced about said core forming chamber relatively to the other end thereof in the direction of rotation of said rollers.

31. In a compressor for food crops the combination of a plurality of rollers, each generally in the shape of one-half of a hyperboloid, said rollers being arranged in a cluster, such that the large ends thereof are disposed in a common direction and the surfaces of the rollers define between them a core forming chamber, two of the rollers being spaced apart to provide a charging opening, means for rotating the rollers in a common direction for rolling a body of crop material between the rollers, and the rollers being arranged so that the axes thereof recede from the region of the core forming chamber in the direction of said large ends and are skewed in relation to said chamber so that the distal ends of said axes are circumferentially displaced relatively to the proximal ends thereof about said core forming chamber in the direction of rotation of said rollers, and means for restricting the movement of a core of crop material out of said core forming chamber.

32. A crop material compressor comprising a set of three rollers, each having a cross section increasing from a minimum diameter at one end so as to have a large end and a small end, means for supporting the rollers with their axes substantially as close together as possible and with their large ends in a position such that said axes extend in a direction diverging from each other and skewed, means for rotating said rollers in the direction in which said large ends are displaced, the surfaces of said rollers approaching each other to a position such that crop material introduced between the rollers will be rolled and compressed into a rotating core of a predetermined diameter, and the diameter of said rollers at any point where they contact said core being several times that of said core.

References Cited

UNITED STATES PATENTS

| | | |
|---|---|---|
| 963,775 | 7/1910 | Killman. |
| 963,823 | 7/1910 | Spoon. |
| 2,207,795 | 7/1940 | Grimm _____ 107—9 |
| 2,716,318 | 8/1955 | Skromme _____ 56—1 |
| 2,893,308 | 7/1959 | Bodisch _____ 100—15 |
| 3,021,782 | 2/1962 | Ginaven _____ 100—146 |
| 3,055,374 | 9/1962 | Koch et al. _____ 100—98 X |
| 3,191,366 | 6/1965 | Molitorisz _____ 56—1 |
| 3,244,088 | 4/1966 | Bushmeyer et al. ____ 100—95 X |

LOUIS O. MAASSEL, *Primary Examiner.*